United States Patent
Hu et al.

(10) Patent No.: US 10,652,571 B2
(45) Date of Patent: May 12, 2020

(54) ADVANCED MOTION VECTOR PREDICTION SPEEDUPS FOR VIDEO CODING

(71) Applicant: QUALCOMM Incorporated, San Diego, CA (US)

(72) Inventors: Nan Hu, San Diego, CA (US); Hsiao-Chiang Chuang, San Diego, CA (US); Xiang Li, Los Gatos, CA (US); Vijayaraghavan Thirumalai, Fremont, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/255,512

(22) Filed: Jan. 23, 2019

(65) Prior Publication Data

US 2019/0230376 A1   Jul. 25, 2019

Related U.S. Application Data

(60) Provisional application No. 62/621,804, filed on Jan. 25, 2018.

(51) Int. Cl.
*H04N 19/52* (2014.01)
*H04N 19/96* (2014.01)
(Continued)

(52) U.S. Cl.
CPC ........... *H04N 19/52* (2014.11); *H04N 19/105* (2014.11); *H04N 19/134* (2014.11);
(Continued)

(58) Field of Classification Search
None
See application file for complete search history.

(56) References Cited

U.S. PATENT DOCUMENTS 10,212,444 B2    2/2019  Li et al.
2012/0121015 A1  5/2012  Yang
(Continued)

FOREIGN PATENT DOCUMENTS

WO    2015192372 A1    12/2015

OTHER PUBLICATIONS

Seregin V., et al., "CE1: Unidirectional Illumination Compensation (CE1-5.1)", Joint Video Experts Team (JVET) of ITU-T SG 16 WP 3 and ISO/IEC JTC 1/SC 29/WG 11, JVET-N0343, 14th Meeting, Mar. 19-27, 2019, 3 pages.

(Continued)

*Primary Examiner* — Christopher G Findley
(74) *Attorney, Agent, or Firm* — Shumaker & Sieffert, P.A.

(57) ABSTRACT

A video encoder performs an Advanced Motion Vector Prediction (AMVP) process for a current block of a current picture. As part of performing the AMVP process, the video encoder may determine whether local illumination compensation (LIC) is being applied in the AMVP process. Based on LIC being applied in the AMVP process, the video encoder may skip a bi-directional AMVP motion estimation process that sets a cost associated with encoding the current block using a bi-directional AMVP mode. Rather, the video encoder may set the cost to a maximum cost value.

23 Claims, 13 Drawing Sheets

(51) Int. Cl.
| | |
|---|---|
| H04N 19/176 | (2014.01) |
| H04N 19/184 | (2014.01) |
| H04N 19/70 | (2014.01) |
| H04N 19/105 | (2014.01) |
| H04N 19/577 | (2014.01) |
| H04N 19/134 | (2014.01) |
| H04N 19/174 | (2014.01) |
| H04N 19/179 | (2014.01) |
| H04N 19/46 | (2014.01) |
| H04N 19/157 | (2014.01) |
| H04N 19/147 | (2014.01) |

(52) U.S. Cl.
CPC ......... *H04N 19/174* (2014.11); *H04N 19/176* (2014.11); *H04N 19/179* (2014.11); *H04N 19/184* (2014.11); *H04N 19/46* (2014.11); *H04N 19/577* (2014.11); *H04N 19/70* (2014.11); *H04N 19/96* (2014.11); *H04N 19/147* (2014.11); *H04N 19/157* (2014.11)

(56) References Cited

U.S. PATENT DOCUMENTS

| | | | | |
|---|---|---|---|---|
| 2015/0326881 | A1* | 11/2015 | Ikai | H04N 19/117 |
| | | | | 375/240.12 |
| 2015/0350642 | A1* | 12/2015 | Park | H04N 19/105 |
| | | | | 375/240.12 |
| 2016/0366415 | A1 | 12/2016 | Liu et al. | |
| 2016/0366416 | A1* | 12/2016 | Liu | H04N 19/52 |
| 2017/0272782 | A1 | 9/2017 | Li et al. | |
| 2018/0278949 | A1* | 9/2018 | Karczewicz | H04N 19/587 |
| 2018/0309990 | A1* | 10/2018 | Alshina | H04N 19/70 |
| 2019/0007682 | A1* | 1/2019 | Kanoh | H04N 19/14 |

OTHER PUBLICATIONS

Seregin V., et al., "CE10-Realated: Unidirectional Illumination Compensation", Joint Video Experts Team (JVET) of ITU-T SG 16 WP 3 and ISO/IEC JTC 1/SC 29/WG 11, JVET-M0500, 13th Meeting, Jan. 9-18, 2019, 3 pages.

International Search Report and Written Opinion—PCT/US2019/014972—ISO/EPO—dated Jul. 3, 2019.

Liu H., et al., "Local Illumination Compensation", 52, VCEG Meeting, Jun. 19, 2015-Jun. 26, 2015, Warsaw, (Video Coding Experts Group of ITU-T SG.16), No. VCEG-AZ06, Jun. 18, 2015 (Jun. 18, 2015),11 Pages, XP030003883, Section 2 and 2.3.

Kang J., et al., "CE4.h related: Coding of Illumination Compensation Flag", 5. JCT-3V Meeting; Jul. 27, 2013-Aug. 2, 2013; Vienna; (The Joint Collaborative Team on 3D Video Coding Extension Development of ISO/IEC JTC1/SC29/WG11 and ITU-T SG.16); URL: http://phenix.int-evry.fr/jct2/, No. JCT3V-E0135, Jul. 19, 2013 (Jul. 19, 2013), XP030131154, pp. 1-9, Section 2.1.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

ITU-T H.265, "Series H: Audiovisual and Multimedia Systems, Infrastructure of audiovisual services—Coding of moving video, High efficiency video coding," The International Telecommunication Union. Dec. 2016, 664 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.263, Series H: Audiovisual and Multimedia Systems, Infrastructure of audiovisual services—Coding of moving video, Video coding for low bit rate communication, The International Telecommunication Union. Jan. 2005, 226 pp.

ITU-T H.262 (Feb. 2000), "Information Technology—Generic Coding of Moving Pictures and Associated Audio nformation: Video", Series H: Audiovisual and Multimedia Systems, Infrastructure of Audiovisual Services—Coding of Moving Video, Feb. 2000, 220 pages.

ITU-T H.261, Line Transmission of Non-Telephone Signals, Video Codec for Audiovisual Services at p × 64 kbits, The International Telecommunication Union, Mar. 1993, 29 pp.

Wang., et al., "High Efficiency Video Coding (HEVC) Defect Report 2," Joint Collaboration Team of Video Coding, ITU-T SG 16 WP 3 and ISO/IEC JTC 1/SC 29/WG 11, 15th Meeting, Geneva, CH, Oct. 23-Nov. 1, 2013, Document: JCTVC-01003_V2, 311 pages.

Flynn D., et al., "High Efficiency Video Coding (HEVC) Range Extensions text specification: Draft 6," (Joint 31 Collaborative Team on Video Coding of ITU-T SG.16 WP 3 and ISO/IEC JTC1/SC29/WG11), 16th Meeting: San Jose, US, Jan. 9-17, 2014, Document: JCTVC-P1005_v1, 368 pages.

Leannec, F.L., et al., "Asymmetric Coding Units in QTBT," Joint Video Exploration Team (JVET) of ITU-T SG 16 WP 3 and ISO/IEC JTC 1/SC 29/WG 11; 4th Meeting, Chengdu, CN; Oct. 15-21, 2016, No. JVET-D0064, Oct. 10, 2016, 10 pp.

Han W-J., et al., "Improved Video Compression Efficiency Through Flexible Unit Representation and Corresponding Extension of Coding Tools," IEEE Transactions on Circuits and Systems for Video Technology, vol. 20, No. 12, Dec. 2010, pp. 1709-1720.

An J., et al., "Block partitioning structure for next generation video coding", MPEG doc. m37524 and ITU-T SG16 Doc. COM16-C966-E, Oct. 2015, pp. 1-7.

* cited by examiner

PART_2Nx2N  PART_2NxN  PART_Nx2N  PART_NxN

PART_2NxnU  PART_2NxnD  PART_nLx2N  PART_nRx2N

ADVANCED MOTION VECTOR PREDICTION SPEEDUPS FOR VIDEO CODING

This application claims the benefit of U.S. Provisional Patent Application 62/621,804, filed Jan. 25, 2018, the entire content of which is incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.261, ITU-T H.262, ITU-T H.263, ITU-T H.264 (also known as ISO/IEC MPEG-4 AVC), including its Scalable Video Coding (SVC) and Multiview Video Coding (MVC) extensions, the High Efficiency Video Coding (HEVC) standard (ITU-T H.265), and extensions of such standards. The video devices may transmit, receive, encode, decode, and/or store digital video information more efficiently by implementing such video coding techniques.

The design of High-Efficiency Video Coding (HEVC) was finalized by the Joint Collaboration Team on Video Coding (JCT-VC) of ITU-T Video Coding Experts Group (VCEG) and ISO/IEC Motion Picture Experts Group (MPEG). Wang et al., "High Efficiency Video Coding (HEVC) Defect Report 2," Joint Collaborative Team on Video Coding (JCT-VC) of ITU-T SG 16 WP 3 and ISO/IEC JTC 1/SC 29/WG 11, 15$^{th}$ Meeting, Geneva, CH, 23 Oct.-1 Nov. 2013 is a HEVC draft specification, referred to as HEVC WD hereinafter, which is available from http://phenix.int-evey.fr/jct/doc_end_user/documents/15_Geneva/wg11/JCTVC-O1003-v2.zip. The Range Extensions to HEVC, namely HEVC-Rext, was also developed by the JCT-VC. Flynn et al., "High Efficiency Video Coding (HEVC) Range Extensions text specification: Draft 6," Joint Collaborative Team on Video Coding (JCT-VC) of ITU-T SG 16 WP 3 and ISO/IEC JTC 1/SC 29/WG 11, 16$^{th}$ Meeting, San Jose, US, 9-17 Jan. 2014 is a Working Draft (WD) of Range extensions, referred to as RExt WD6 hereinafter, which is available from http://phenix.int-evry.fr/jct/doc_end_user/documents/16_San%20Jose/wg11/JCTVC-P1005-v1.zip.

Investigation of new coding tools for future video coding have begun (JVET-Joint Video Exploration Team), and technologies that improve the coding efficiency for video coding have been begun to be proposed. There is evidence that significant improvements in coding efficiency can be obtained by exploiting the characteristics of video content, especially for the high-resolution content like 4K, with novel dedicated coding tools beyond H.265/HEVC.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for advanced motion vector prediction (AMVP) speedups for video encoders. The techniques of this disclosure may be applied to existing or future video coding standards. The disclosed techniques are described in detail below.

In one example, this disclosure describes a method of encoding video data, the method comprising: performing, by a video encoder, an Advanced Motion Vector Prediction (AMVP) process for a current block of a current picture of the video data, wherein performing the AMVP process comprises: determining, by the video encoder, a first cost by performing a uni-directional AMVP motion estimation process using reference pictures in a first reference picture list; determining, by the video encoder, a second cost by performing the uni-directional AMVP motion estimation process using reference pictures in a second reference picture list; determining, by the video encoder, a non-fixed reference picture list, wherein the non-fixed reference picture list is the first reference picture list when the first cost is less than the second cost and the non-fixed reference picture list is the second reference picture list when the second cost is less than the first cost; determining, by the video encoder, whether local illumination compensation (LIC) is being applied in the AMVP process; based on LIC being applied in the AMVP process: skipping, by the video encoder, a bi-directional AMVP motion estimation process that sets a third cost to be a cost associated with encoding the current block using a bi-directional AMVP mode; and setting, by the video encoder, the third cost to a maximum cost value; and determining, by the video encoder, a set of motion information based on a comparison of the first cost, the second cost, and the third cost, wherein the set of motion information includes one or more motion vectors; and generating, by the video encoder, residual data indicating differences between the current block and a predictive block pointed to by the one or more motion vectors of the set of motion information.

In another example, this disclosure describes a video encoding device comprising: a memory configured to store video data; and one or more processing circuits configured to: perform an Advanced Motion Vector Prediction (AMVP) process for a current block of a current picture of the video data, wherein the one or more processing circuits are configured such that, as part of performing the AMVP process, the one or more processing circuits: determine a first cost by performing a uni-directional AMVP motion estimation process using reference pictures in a first reference picture list; determine a second cost by performing the uni-directional AMVP motion estimation process using reference pictures in a second reference picture list; determine a non-fixed reference picture list, wherein the non-fixed reference picture list is the first reference picture list when the first cost is less than the second cost and the non-fixed reference picture list is the second reference picture list when the second cost is less than the first cost; determine whether local illumination compensation (LIC) is being applied in the AMVP process; based on LIC being applied in the AMVP process: skip a bi-directional AMVP motion estimation process that sets a third cost to be a cost associated with encoding the current block using a bi-directional AMVP mode; and set the third cost to a maximum cost value; and determine a set of motion information based on a comparison of the first cost, the second cost, and the third cost, wherein the set of motion information includes one or more motion vectors; and generate residual data indicating differences between the current block and a predictive block pointed to by the one or more motion vectors of the set of motion information.

In another example, this disclosure describes a video encoding device comprising: means for performing, by the video encoder, an Advanced Motion Vector Prediction (AMVP) process for a current block of a current picture of video data, the means for performing the AMVP process comprises: means for determining a first cost by performing a uni-directional AMVP motion estimation process using reference pictures in a first reference picture list; means for determining a second cost by performing the uni-directional AMVP motion estimation process using reference pictures in a second reference picture list; means for determining a non-fixed reference picture list, wherein the non-fixed reference picture list is the first reference picture list when the first cost is less than the second cost and the non-fixed reference picture list is the second reference picture list when the second cost is less than the first cost; means for determining whether local illumination compensation (LIC) is being applied in the AMVP process; based on LIC being applied in the AMVP process: means for skipping a bi-directional AMVP motion estimation process that sets a third cost to be a cost associated with encoding the current block using a bi-directional AMVP mode; and means for setting the third cost to a maximum cost value; and means for determining a set of motion information based on a comparison of the first cost, the second cost, and the third cost, wherein the set of motion information includes one or more motion vectors; and means for generating residual data indicating differences between the current block and a predictive block pointed to by the one or more motion vectors of the set of motion information.

In another example, this disclosure describes a computer-readable storage medium having instructions stored thereon that, when executed, cause a video encoding device to: perform an Advanced Motion Vector Prediction (AMVP) process for a current block of a current picture of video data, wherein as part of causing the video encoding device to perform the AMVP process, execution of the instructions causes the video encoding device to: determine a first cost by performing a uni-directional AMVP motion estimation process using reference pictures in a first reference picture list; determine a second cost by performing the uni-directional AMVP motion estimation process using reference pictures in a second reference picture list; determine a non-fixed reference picture list, wherein the non-fixed reference picture list is the first reference picture list when the first cost is less than the second cost and the non-fixed reference picture list is the second reference picture list when the second cost is less than the first cost; determine whether local illumination compensation (LIC) is being applied in the AMVP process; based on LIC being applied in the AMVP process: skip a bi-directional AMVP motion estimation process that sets a third cost to be a cost associated with encoding the current block using a bi-directional AMVP mode; and set the third cost to a maximum cost value; and determine a set of motion information based on a comparison of the first cost, the second cost, and the third cost, wherein the set of motion information includes one or more motion vectors; and generate residual data indicating differences between the current block and a predictive block pointed to by the one or more motion vectors of the set of motion information.

In another example, this disclosure describes a method for decoding video data, the method comprising: determining, by a video decoder, that a block of the video data that is encoded using Advanced Motion Vector Prediction (AMVP) is encoded using uni-directional AMVP and not bi-directional AMVP; and based on the block being encoded using uni-directional AMVP: obtaining, by the video decoder, a local illumination compensation (LIC) flag from an encoded video bitstream, the LIC flag indicating whether the block is encoded using LIC; using, by the video decoder, uni-directional AMVP to generate a first predicted signal for the block; based on the LIC flag indicating that the block is encoded using LIC, using, by the video decoder, LIC to generate a second predicted signal for the block based on the first predicted signal; and forming, by the video decoder, a decoded video block by summing a residual block and the second predicted signal. Other examples of this disclosure describe devices for decoding video data that comprise means for performing this method and computer-readable storage medium having instructions that when executed cause one or more processing circuits to perform this method.

In another example, this disclosure describes a device for decoding video data, the device comprising: a memory configured to store video data; and one or more processing circuits configured to: determine that a block of the video data that is encoded using Advanced Motion Vector Prediction (AMVP) is encoded using uni-directional AMVP and not bi-directional AMVP; and based on the block being encoded using uni-directional AMVP: obtain a local illumination compensation (LIC) flag from an encoded video bitstream, the LIC flag indicating whether the block is encoded using LIC; use uni-directional AMVP to generate a first predicted signal for the block; based on the LIC flag indicating that the block is encoded using LIC, use LIC to generate a second predicted signal for the block based on the first predicted signal; and form a decoded video block by summing a residual block and the second predicted signal.

In another example, this disclosure describes a method for decoding video data, the method comprising: determining, by a video decoder, based on a local illumination compensation (LIC) flag signaled in an encoded video bitstream, that a block of the video data that is encoded using Advanced Motion Vector Prediction (AMVP) is encoded using LIC; and based on the block being encoded using LIC: determining, by the video decoder, that the block is encoded using uni-directional AMVP and not bi-directional AMVP without decoding any syntax elements that explicitly indicate that the block is encoded using uni-directional AMVP and not bi-directional AMVP; using, by the video decoder, uni-directional AMVP to generate a first predicted signal for the block; use LIC to generate a second predicted signal for the block based on the first predicted signal; and forming, by the video decoder, a decoded video block by summing a residual block and the second predicted signal. Other examples of this disclosure describe devices for decoding video data that comprise means for performing this method and computer-readable storage medium having instructions that when executed cause one or more processing circuits to perform this method.

In another example, this disclosure describes a device for decoding video data, the device comprising: a memory configured to store video data; and one or more processing circuits configured to: determine, based on a local illumination compensation (LIC) flag signaled in an encoded video bitstream, that a block of the video data that is encoded using Advanced Motion Vector Prediction (AMVP) is encoded using LIC; based on the block being encoded using LIC: determine that the block is encoded using uni-directional AMVP and not bi-directional AMVP without decoding any syntax elements that explicitly indicate that the block is encoded using uni-directional AMVP and not bi-directional AMVP; use uni-directional AMVP to generate a first predicted signal for the block; use LIC to generate a second predicted signal for the block based on the first predicted signal; and form a decoded video block by summing a residual block and the second predicted signal.

The details of one or more examples are set forth in the accompanying drawings and the description below. Other features, objects, and advantages will be apparent from the description, drawings, and claims.

DETAILED DESCRIPTION

Figure 1:
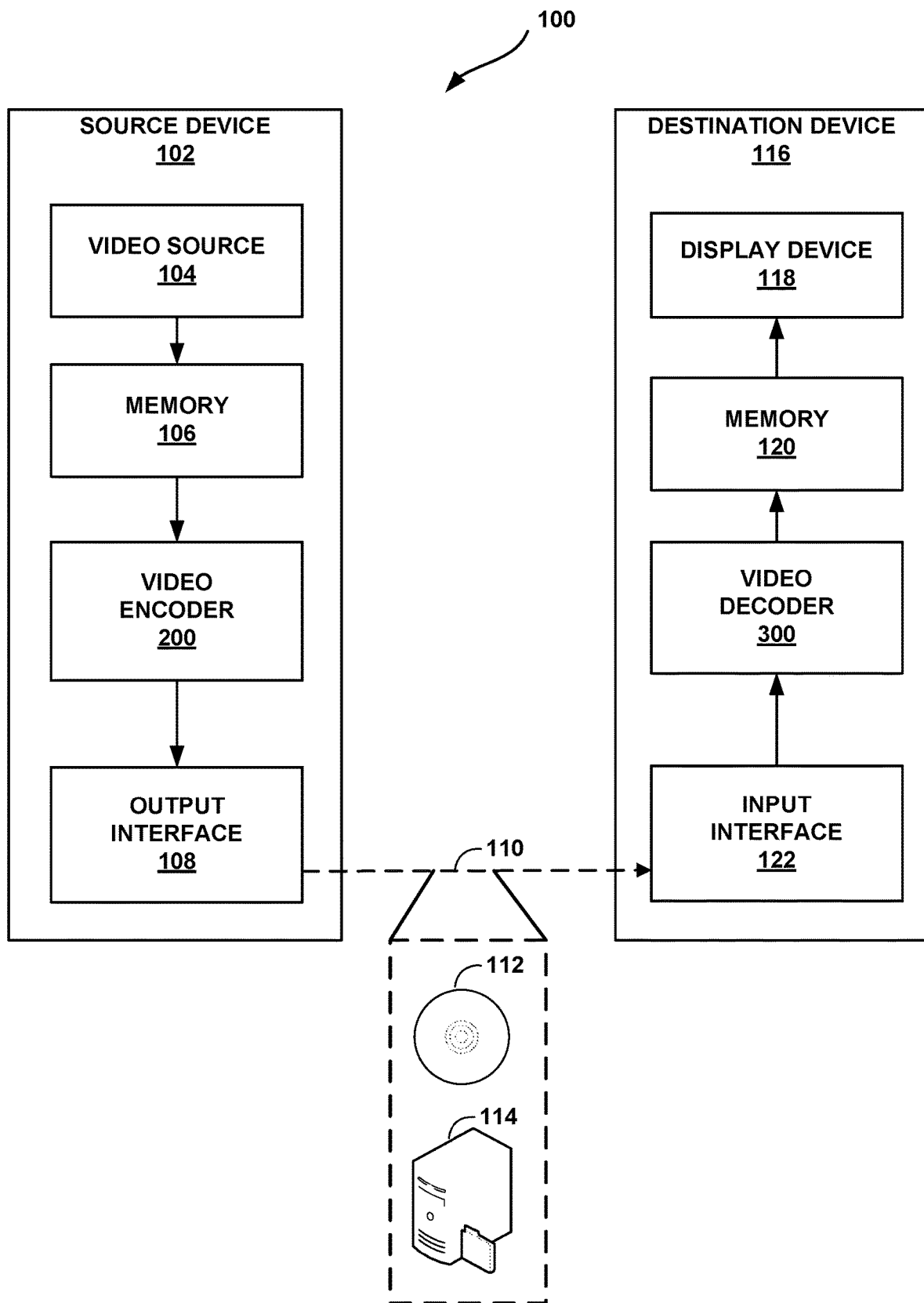
FIG. 1 is a block diagram illustrating an example video encoding and decoding system that may utilize techniques for implementing advanced motion vector prediction (AMVP) speedups for video encoding, in accordance with one or more techniques of this disclosure.

The process of encoding video data may involve a large number of rate-distortion (RD) comparisons. Each RD comparison consumes energy and slows the process of encoding the video data. Therefore, avoiding unnecessary RD comparisons may be advantageous to reduce energy consumption and accelerate the process of encoding the video data. Other types of cost estimation for various encoding modes may also consume energy and slow the encoding process.

Local illumination compensation (LIC) is a coding tool that may be enabled or disabled at the level of individual blocks, such as coding units (CUs), of a picture. LIC may be used to efficiently encode local changes to the illumination levels of objects shown in the video data, such as when an object moves into or out of a shadow. Because blocks encoded using LIC may represent objects that are moving, it may be advantageous to use motion prediction tools, such as Advanced Motion Vector Prediction (AMVP), when encoding the blocks. However, encoding a block using both LIC and AMVP may significantly increase the number of RD comparisons and other cost estimations performed by the video encoder because the video encoder may need to perform an AMVP process with LIC and also perform the AMVP process without applying LIC.

This disclosure describes techniques that may accelerate the process of encoding video data by potentially reducing the number of RD comparisons or other operations performed by the video encoder. For example, this disclosure describes techniques that a video encoder may use to speed up the video encoding process when one or more of LIC and affine prediction are applied, thereby potentially reducing encoding time and potentially reducing energy usage.

For instance, in one example, a video encoder may perform an AMVP process for a current block of a current picture of the video data. In this example, as part of performing the AMVP process, the video encoder may determine a first cost by performing a uni-directional AMVP motion estimation process using reference pictures in a first reference picture list. Additionally, the video encoder may determine a second cost by performing the uni-directional AMVP motion estimation process using reference pictures in a second reference picture list. The video encoder may also determine a non-fixed reference picture list. The non-fixed reference picture list may be the first reference picture list when the first cost is less than the second cost. The non-fixed reference picture list may be the second reference picture list when the second cost is less than the first cost.

Furthermore, in this example, the video encoder may determine whether local illumination compensation (LIC) is being applied in the AMVP process. When LIC is being applied in the AMVP process, the video encoder may skip a bi-directional AMVP motion estimation process that sets a third cost to be a cost associated with encoding the current block using a bi-directional AMVP mode. Additionally, when LIC is being applied in the AMVP process, the video encoder may set the third cost to a maximum cost value. The video encoder may also determine a set of motion information based on a comparison of the first cost, the second cost, and the third cost. In this example, the set of motion information includes one or more motion vectors. The video encoder may generate residual data indicating differences between the current block and a predictive block pointed to by the one or more motion vectors of the set of motion information.

FIG. 1 is a block diagram illustrating an example video encoding and decoding system 10 that may utilize techniques for implementing advanced motion vector prediction (AMVP) speedups for video encoding, in accordance with one or more techniques of this disclosure. System 100 includes a source device 102 that provides encoded video data to be decoded at a later time by a destination device 116. In the example of FIG. 1, source device 102 provides the encoded video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 102 and destination device 116 may be equipped for wireless communication.

Destination device 116 may receive the encoded video data to be decoded via computer-readable medium 110. Computer-readable medium 110 may comprise any type of medium or device capable of moving the encoded video data from source device 102 to destination device 116. In one example, computer-readable medium 110 may comprise a communication medium to enable source device 102 to transmit encoded video data directly to destination device 116 in real-time. The encoded video data may be modulated according to a communication standard, such as a wireless communication protocol, and transmitted to destination device 116. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a computer-readable data storage medium, decoding of digital video stored on a computer-readable data storage medium, or other applications. In some examples, system 10 may be configured to support one-way or two-way video transmission to support applications such as video streaming, video playback, video broadcasting, and/or video telephony.

In the example of FIG. 1, source device 102 includes a video source 104, a memory 106, a video encoder 200, and an output interface 108. Destination device 116 includes a memory 120, an input interface 122, a video decoder 300, and a display device 118. In accordance with this disclosure, video encoder 200 of source device 102 may be configured to apply the techniques for encoding video data that implement AMVP speedups. In other examples, source device 102 and destination device 116 may include other components or arrangements. For example, source device 102 may receive video data from an external video source, such as an external camera. Likewise, destination device 116 may interface with an external display device, rather than including an integrated display device.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

The illustrated system 100 of FIG. 1 is merely one example. Techniques for coding video data that implement the AMVP speedups of this disclosure may be performed by any digital video encoding and/or decoding device. Although generally the techniques of this disclosure are performed by a video encoding device, the techniques may also be performed by a video encoder/decoder, typically referred to as a "CODEC." Source device 102 and destination device 116 are merely examples of such coding devices in which source device 102 generates coded video data for transmission to destination device 116. In some examples, source device 102 and destination device 116 may operate in a substantially symmetrical manner such that each of source device 102 and destination device 116 include video encoding and decoding components. Hence, system 100 may support one-way or two-way video transmission between source device 102 and destination device 116, e.g., for video streaming, video playback, video broadcasting, or video telephony.

Video source 104 of source device 102 may include a video capture device, such as a video camera, a video archive containing previously captured video, and/or a video feed interface to receive video from a video content provider. As a further alternative, video source 104 may generate computer graphics-based data as the source video, or a combination of live video, archived video, and computer-generated video. In some cases, if video source 104 is a video camera, source device 102 and destination device 116 may form so-called camera phones or video phones. As mentioned above, however, the techniques described in this disclosure may be applicable to video coding in general and may be applied to wireless and/or wired applications. In each case, the captured, pre-captured, or computer-generated video may be encoded by video encoder 200. The encoded video information may then be output by output interface 108 onto a computer-readable medium 110.

In some examples, encoded data may be output from output interface 108 to a storage device. Similarly, encoded data may be accessed from the storage device by input interface 122. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Computer-readable medium 110 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 102 and provide the encoded video data to destination device 116, e.g., via network transmission. Similarly, a computing device of a medium production facility, such as a disc stamping facility, may receive encoded video data from source device 102 and produce a disc containing the encoded video data. Therefore, computer-readable medium 110 may be understood to include one or more computer-readable media of various forms, in various examples.

Input interface 122 of destination device 116 receives information from computer-readable medium 110. The information of computer-readable medium 110 may include syntax information defined by video encoder 200, which is also used by video decoder 300, that includes syntax elements that describe characteristics and/or processing of blocks and other coded units. Display device 118 displays the decoded video data to a user and may comprise any of a variety of display devices such as a cathode ray tube (CRT), a liquid crystal display (LCD), a plasma display, an organic light emitting diode (OLED) display, or another type of display device.

Video encoder 200 and video decoder 300 may operate according to a video coding standard, such as the High Efficiency Video Coding (HEVC) standard, also referred to as ITU-T H.265. Alternatively, video encoder 200 and video decoder 300 may operate according to other proprietary or industry standards, such as the ITU-T H.264 standard, alternatively referred to as MPEG 4, Part 10, Advanced Video Coding (AVC), or extensions of such standards. The techniques of this disclosure, however, are not limited to any particular coding standard. Alternatively, video encoder 200 and video decoder 300 may operate according to other proprietary or industry standards, such as the Joint Exploration Test Model (JEM). Although not shown in FIG. 1, in some aspects, video encoder 200 and video decoder 300 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device.

In video coding, tree data structures may be used to represent video block partitioning. For example, in HEVC, a quadtree is used to represent partitioning of a coding tree block (CTB) into coding units (CUs). Other tree structures have been used for other block-based video coding paradigms. For example, binary trees have been used to represent partitioning of blocks into either two horizontal or two vertical blocks. Multi-type trees, such as quadtree binary trees (QTBTs), may be used to combine quadtrees and binary trees.

A multi-type-tree structure is a kind of flat structure. All tree types are equally important for a tree node, which makes multi-type-tree traversal complicated. In addition, in conventional coding techniques related to multi-type-tree structures, some coding tools are not compatible with multi-type-tree structures and/or QTBT structures. For example, overlapped block motion compensation (OBMC) is less efficient when used with multi-type-trees or QTBTs, because there are no PU boundaries in these tree types. In this case, OBMC can only be applied to one side of CU boundaries. Likewise, overlapped transform techniques cannot be applied, since there are no PU boundaries and overlapped transforms are not allowed to cross CU boundaries. It is also difficult to define a region where sub-blocks can share the same quantization parameter (QP) prediction values to efficiently signal QP variation when using multi-type-tree or QTBT structures.

In general, according to HEVC, a video picture may be divided into a sequence of coding tree units (CTUs) (or largest coding units (LCUs)) that may include both luma and chroma samples. Alternatively, CTUs may include monochrome data (i.e., only luma samples). Syntax data within a bitstream may define a size for the CTU, which is a largest coding unit in terms of the number of pixels. A slice includes a number of consecutive CTUs in coding order. A video picture may be partitioned into one or more slices. Each CTU may be split into CUs according to a quadtree. In general, a quadtree data structure includes one node per CU, with a root node corresponding to the CTU. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively and may depend on whether the CU is split into sub-CUs. If a CU is not split further, it is referred as a leaf CU. In this disclosure, four sub-CUs of a leaf CU will also be referred to as leaf-CUs even if there is no explicit splitting of the original leaf CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a CTU may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a CTU may be split, referred to as a maximum CU depth, and may also define a minimum size of the coding nodes. Accordingly, a bitstream may also define a smallest coding unit (SCU). This disclosure uses the term "block" to refer to any of a CU, prediction unit (PU), or transform unit (TU), in the context of HEVC, or similar data structures in the context of other standards (e.g., macroblocks and sub-blocks thereof in H.264/AVC).

In addition or in the alternative, video encoder 200 and video decoder 300 may be configured to use center-side triple tree alike partitioning, in addition to a HEVC-style coding tree structure. For example, video encoder 200 and video decoder 300 may use new partitions, such as center-side triple tree, in addition to asymmetric motion partitioning (AMP) or to replace AMP as PU partitioning types.

A CU may include a coding node, one or more prediction units (PUs), and one or more transform units (TUs) associated with the coding node. A size of the CU corresponds to a size of the coding node and is generally square in shape. The size of the CU may range from 8×8 pixels up to the size of the CTU with a maximum size, e.g., 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape. In JEM, CUs are not partitioned into PUs. Hence, in JEM, a CU may be considered to be a PU.

The HEVC standard allows for transformations according to TUs, which may be different for different CUs. The TUs are typically sized based on the size of PUs within a given CU defined for a partitioned CTU, although this may not always be the case. The TUs are typically the same size or smaller than the PUs. In some examples, residual samples corresponding to a CU may be subdivided into smaller units using a quadtree structure known as a residual quad tree (RQT). The leaf nodes of the RQT may be referred to as transform units (TUs). Pixel difference values associated with the TUs may be transformed to produce transform coefficients, which may be quantized.

In HEVC, a leaf CU may include one or more PUs. In general, a PU represents a spatial area corresponding to all or a portion of the corresponding CU and may include data for retrieving and/or generating a reference sample for the PU. Moreover, a PU includes data related to prediction. When the PU is inter-mode encoded, the PU may include data defining motion information, such as one or more motion vectors, for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In HEVC, a leaf CU may also include one or more TUs. The TUs may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf TU. Video encoder 200 may calculate a residual value for each leaf TU as a difference between a predictive block and the original block. A TU is not necessarily limited to the size of a PU. Thus, TUs may be larger or smaller than a PU. In general, this disclosure uses the terms CU and TU to refer to leaf-CU and leaf TU, respectively, unless noted otherwise.

A video sequence typically includes a series of video frames or pictures, starting with a random access point (RAP) picture. A video sequence may include syntax data in a sequence parameter set (SPS) that describes characteristics of the video sequence. Each slice of a picture may include slice syntax data that describes an encoding mode for the respective slice. Video coders typically operate on video blocks within individual video slices in order to encode the video data. A video block may correspond to a coding node within a CU. The video blocks may have fixed or varying sizes, and may differ in size according to a specified coding standard.

Prediction may be performed for PUs of various sizes. Assuming that the size of a particular CU is 2N×2N, intra-prediction may be performed on PU sizes of 2N×2N or N×N, and inter-prediction may be performed on symmetric PU sizes of 2N×2N, 2N×N, N×2N, or N×N. Asymmetric partitioning for inter-prediction may also be performed for PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

As mentioned above, a video coder (e.g., video encoder 200 or video decoder 300) may apply inter prediction to generate a predictive block for a video block of a current picture. For instance, the video coder may apply inter prediction to generate a predictive block for a prediction block of a CU. If the video coder applies inter prediction to generate a predictive block, the video coder generates the predictive block based on decoded samples of one or more reference pictures. Typically, the reference pictures are pictures other than the current picture. In some video coding specifications, a video coder may also treat the current picture itself as a reference picture. The video coder may determine one or more reference picture lists. Each of the reference picture lists includes zero or more reference pictures. One of the reference picture lists may be referred to as Reference Picture List 0 (RefPicList0) and another reference picture list may be referred to as Reference Picture list 1 (RefPicList1).

The video coder may apply uni-directional inter prediction or bi-directional inter prediction to generate a predictive block. When the video coder applies uni-directional inter prediction to generate a predictive block for a video block, the video coder determines a single reference block for the video block based on a samples of a single reference picture. The reference block may be a block of samples that is similar to the prediction block. Furthermore, when the video coder applies uni-directional inter prediction, the video coder may set the predictive block equal to the reference block. When the video coder applies bi-directional inter prediction to generate a predictive block for a video block, the video coder determines two reference blocks for the video block. In some examples, the two reference blocks are in reference pictures in different reference picture lists. Additionally, when the video coder applies bi-direction inter-prediction, the video coder may determine the predictive block based on the two reference blocks. For instance, the video coder may determine the predictive block such that each sample of the predictive block is a weighted average of corresponding samples of the two reference blocks. Reference list indicators may be used to indicate which of the reference picture lists include reference pictures used for determining reference blocks.

As mentioned above, a video coder may determine a reference block based on samples of a reference picture. In some examples, the video coder may determine the reference block such that each sample of the reference block is equal to a sample of the reference picture. In some examples, as part of determining a reference block, the video coder may interpolate samples of the reference block from samples of the reference picture. For example, the video coder may determine that a sample of the predictive block is a weighted average of two or more samples of the reference picture.

In some examples, when video encoder 200 performs uni-directional inter prediction for a current block of a current picture, video encoder 200 identifies a reference block within one or more reference pictures in one of the reference picture lists. For instance, video encoder 200 may search for a reference block within the one or more reference pictures in the reference picture list. In some examples, video encoder 200 uses a mean squared error or other metric to determine the similarity between the reference block and the current block Furthermore, video encoder 200 may determine motion parameters for the current block. The motion parameters for the current block may include a motion vector and a reference index. The motion vector may indicate a spatial displacement between a position of the current block within the current picture and a position of the reference block within the reference picture. The reference index indicates a position within the reference picture list of the reference picture that contains the reference picture list. The predictive block for the current block may be equal to the reference block.

When video encoder 200 performs bi-directional inter prediction for a current block of a current picture, video encoder 200 may identify a first reference block within reference pictures in a first reference picture list ("list 0") and may identify a second reference block within reference pictures in a second reference picture list ("list 1"). For instance, video encoder 200 may search for the first and second reference blocks within the reference pictures in the first and second reference picture lists, respectively. Video encoder 200 may generate, based at least in part on the first and the second reference blocks, the predictive block for the current block. In addition, video encoder 200 may generate a first motion vector that indicates a spatial displacement between the current block and the first reference block. Video encoder 200 may also generate a first reference index that identifies a location within the first reference picture list of the reference picture that contains the first reference block. Furthermore, video encoder 200 may generate a second motion vector that indicates a spatial displacement between the current block and the second reference block. Video encoder 200 may also generate a second reference index that identifies a location within the second reference picture list of the reference picture that includes the second reference block.

When video encoder 200 performs uni-directional inter prediction on a current block, video decoder 300 may use the motion parameters of the current block to identify the reference block of the current block. Video decoder 300 may then generate the predictive block of the current block based on the reference block. When video encoder 200 performs bi-directional inter prediction to determine a predictive block for a current block, video decoder 300 may use the motion parameters of the current block to determine two reference blocks. Video decoder 300 may generate the predictive block of the current block based on the two reference samples of the current block.

Video encoder 200 may signal motion parameters of a block in various ways. Such motion parameters may include motion vectors, reference indexes, reference picture list indicators, and/or other data related to motion. In some examples, video encoder 200 and video decoder 300 may use motion prediction to reduce the amount of data used for signaling motion parameters. Motion prediction may comprise the determination of motion parameters of a block (e.g., a PU, a CU, etc.) based on motion parameters of one or more other blocks. There are various types of motion prediction. For instance, merge mode and advanced motion vector prediction (AMVP) mode are two types of motion prediction.

In merge mode, video encoder 200 generates a candidate list. The candidate list includes a set of candidates that indicate the motion parameters of one or more source blocks. The source blocks may spatially or temporally neighbor a current block. Furthermore, in merge mode, video encoder 200 may select a candidate from the candidate list and may use the motion parameters indicated by the selected candidate as the motion parameters of the current block. Video encoder 200 may signal the position in the candidate list of the selected candidate. Video decoder 300 may determine, based on information obtained from a bitstream, the index into the candidate list. In addition, video decoder 300 may generate the same candidate list and may determine, based on the index, the selected candidate. Video decoder 300 may then use the motion parameters of the selected candidate to generate a predictive block for the current block.

Skip mode is similar to merge mode. In skip mode, video encoder 200 and video decoder 300 generate and use a candidate list in the same way that video encoder 200 and video decoder 300 use the candidate list in merge mode. However, when video encoder 200 signals the motion parameters of a current block using skip mode, video encoder 200 does not signal any residual data for the current block. Accordingly, video decoder 300 may determine a predictive block for the current block based on one or more reference blocks indicated by the motion parameters of a selected candidate in the candidate list. Video decoder 30 may then reconstruct samples in a coding block of the current block such that the reconstructed samples are equal to corresponding samples in the predictive block of the current block.

AMVP mode is similar to merge mode in that video encoder 200 may generate a candidate list for a current block and may select a candidate from the candidate list. However, for each respective reference block used in determining a predictive block for the current block, video encoder 200 may signal a respective motion vector difference (MVD) for the current block, a respective reference index for the current block, and a respective candidate index indicating a selected candidate in the candidate list. An MVD for a block may indicate a difference between a motion vector of the block and a motion vector of the selected candidate. The reference index for the current block indicates a reference picture from which a reference block is determined.

Furthermore, when AMVP mode is used, for each respective reference block used in determining a predictive block for the current block, video decoder 300 may determine a MVD for the current block, a reference index for the current block, and a candidate index and a motion vector prediction (MVP) flag. Video decoder 300 may generate the same candidate list and may determine, based on the candidate index, a selected candidate in the candidate list. As before, this candidate list may include motion vectors of neighboring blocks that are associated with the same reference index as well as a temporal motion vector predictor which is derived based on the motion parameters of the neighboring block of the co-located block in a temporal reference picture. Video decoder 300 may recover a motion vector of the current block by adding the MVD to the motion vector indicated by the selected AMVP candidate. That is, video decoder 300 may determine, based on a motion vector indicated by the selected AMVP candidate and the MVD, the motion vector of the current block. Video decoder 300 may then use the recovered motion vector or motion vectors of the current block to generate predictive blocks for the current block.

When a video coder (e.g., video encoder 200 or video decoder 300) generates an AMVP candidate list for a current block, the video coder may derive one or more AMVP candidates based on the motion parameters of reference blocks (e.g., spatially-neighboring blocks) that contain locations that spatially neighbor the current PU and one or more AMVP candidates based on motion parameters of PUs that temporally neighbor the current PU. The candidate list may include motion vectors of reference blocks that are associated with the same reference index as well as a temporal motion vector predictor which is derived based on the motion parameters (i.e., motion parameters) of the neighboring block of the co-located block in a temporal reference picture. A candidate in a merge candidate list or an AMVP candidate list that is based on the motion parameters of a reference block that temporally neighbors a current block. This disclosure may use the term "temporal motion vector predictor" to refer to a block that is in a different time instance than the current block and is used for motion vector prediction.

Following intra-predictive or inter-predictive coding using one or more PUs of a CU, video encoder 200 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 200 may form the TUs to include quantized transform coefficients representative of the residual data for the CU. That is, video encoder 200 may calculate the residual data (in the form of a residual block), transform the residual block to produce a block of transform coefficients, and then quantize the transform coefficients to form quantized transform coefficients. Video encoder 200 may form a TU including the quantized transform coefficients, as well as other syntax information (e.g., splitting information for the TU).

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. After scanning the quantized transform coefficients to form a one-dimensional vector, video encoder 200 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 200 may also entropy encode syntax elements associated with the encoded video data for use by video decoder 300 in decoding the video data.

Video encoder 200 may further send syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS).

In general, video decoder 300 performs a substantially similar, albeit reciprocal, process to that performed by video encoder 200 to decode encoded data. For example, video decoder 300 inverse quantizes and inverse transforms coefficients of a received TU to reproduce a residual block. Video decoder 300 uses a signaled prediction mode (intra- or inter-prediction) to form a predictive block. Then, video decoder 300 combines the predictive block and the residual block (on a pixel-by-pixel basis) to reproduce the original block. Additional processing may be performed, such as performing a deblocking process to reduce visual artifacts along block boundaries. Furthermore, video decoder 300 may decode syntax elements using CABAC in a manner substantially similar to, albeit reciprocal to, the CABAC encoding process of video encoder 200.

Video encoder 200 and video decoder 300 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 200 and video decoder 300 may be included in one or more encoders or decoders, either of which may be integrated as part of a combined video encoder/decoder (CODEC). A device including video encoder 200 and/or video decoder 300 may comprise an integrated circuit, a microprocessor, and/or a wireless communication device, such as a cellular telephone.

Video encoder 200 and video decoder 300 may be configured to perform any of various techniques of this disclosure, alone or in any combination. For example, as described in greater detail below, video encoder 200 may perform use one or more of the AMVP speedups described in this disclosure to accelerate an encoding process.

Figure 2:
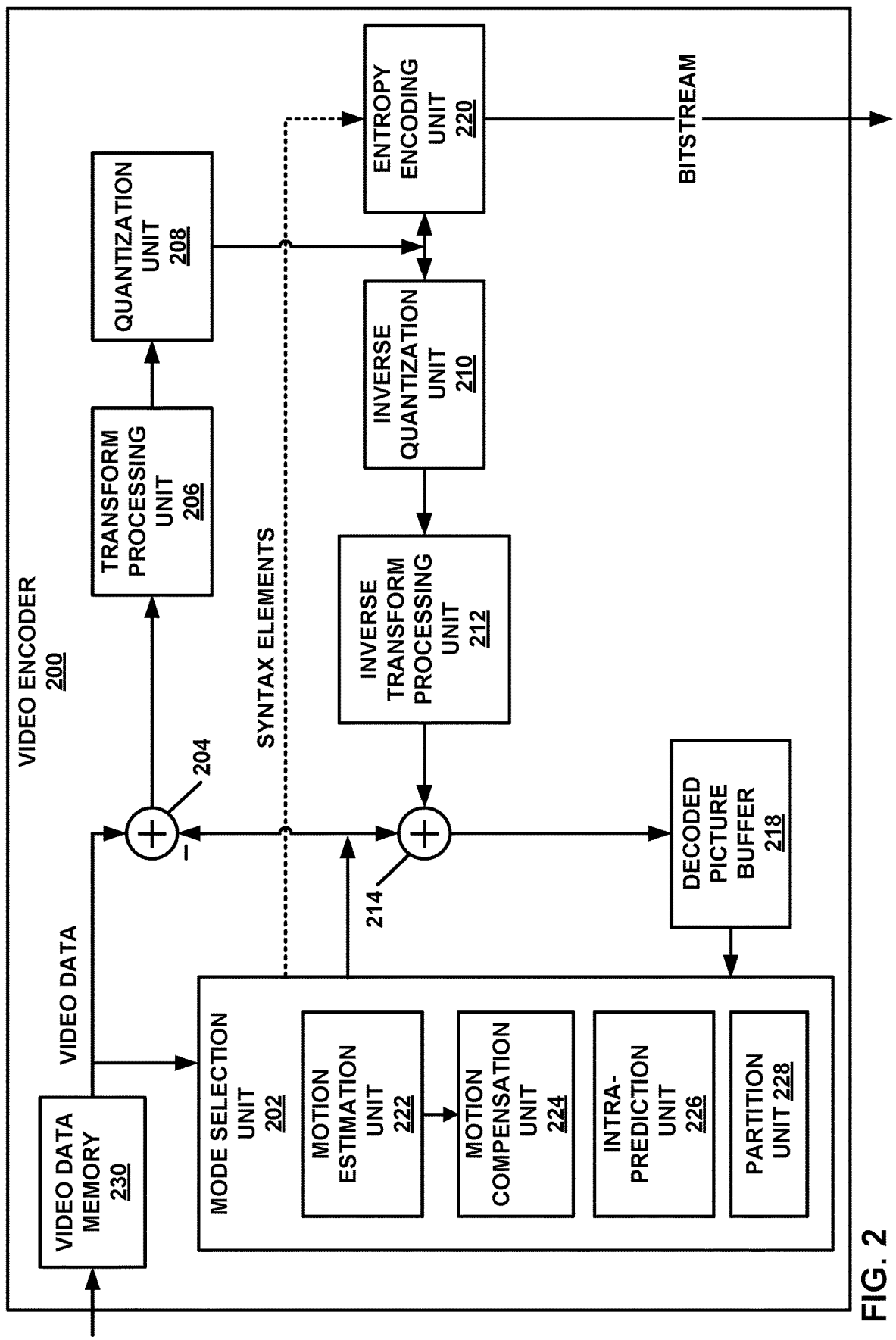
FIG. 2 is a block diagram illustrating an example of a video encoder that may implement techniques for implementing AMVP speedups for video encoding in accordance with one or more techniques of this disclosure.

FIG. 2 is a block diagram illustrating an example of video encoder 200 that may implement techniques for implementing AMVP speedups for video encoding in accordance with one or more techniques of this disclosure. Video encoder 200 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 200 receives a current video block within a video frame to be encoded. In the example of FIG. 2, video encoder 200 includes a mode select unit 202, a video data memory 230, a decoded picture buffer (DPB) 218, a summer 204, a transform processing unit 206, a quantization unit 208, and an entropy encoding unit 220. Mode select unit 202, in turn, includes a motion estimation unit 222, a motion compensation unit 224, an intra-prediction unit 226, and a partition unit 228. For video block reconstruction, video encoder 200 also includes an inverse quantization unit 21, an inverse transform processing unit 212, a summer 214, and a decoded picture buffer 218.

Any or all of video data memory 230, mode select unit 202, summer 204, transform processing unit 206, quantization unit 208, inverse quantization unit 210, inverse transform processing unit 212, summer 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 and/or DPB 218 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

During the encoding process, video encoder 200 receives a video frame or slice to be coded. The frame or slice may be divided into multiple video blocks. Motion estimation unit 222 and motion compensation unit 224 perform inter-predictive encoding of the received video block relative to one or more blocks in one or more reference pictures to provide temporal prediction. Intra-prediction unit 226 may alternatively perform intra-predictive encoding of the received video block relative to one or more neighboring blocks in the same frame or slice as the block to be coded to provide spatial prediction. Video encoder 200 may perform multiple coding passes, e.g., to select an appropriate coding mode for each block of video data.

Moreover, partition unit 228 may partition coding tree blocks of video data using the techniques of this disclosure. That is, partition unit 228 may initially partition a CTB using a region tree of a multi-type-tree, ultimately resulting in one or more region tree leaf nodes. Partition unit 228 may partition the region tree according to quadtree partitioning, QTBT, or hex-tree partitioning, in various examples. Quadtree partitioning includes partitioning each non-leaf node into four child nodes, while hex-tree partitioning includes partitioning each non-leaf node into six child nodes.

In some examples, partition unit 228 may further partition each of the region tree leaf nodes using respective prediction trees. The prediction trees may be partitioned as binary trees, center-side-triple trees, and/or quadtrees. That is, partition unit 228 may partition each node of a prediction tree into four equal sized parts (as in a quadtree), two equal sized parts horizontally or vertically (as in a binary tree), or a center region and two smaller side regions horizontally or vertically (as in a center-side-triple tree). Additionally or alternatively, partition unit 228 may partition a node of the prediction tree using asymmetric motion partitioning (AMP). In some examples, the center-side-triple tree partitioning may replace AMP, while in other examples, the center-side-triple tree partitioning may supplement AMP. Partition unit 228 may generate values for syntax elements indicating how a QTBT or the multi-type-tree for a CTB is partitioned, which may be encoded by entropy encoding unit 220.

Mode select unit 202 may select one of the prediction modes, (intra, inter, or skip), e.g., based on error results (e.g., using rate-distortion analysis), and provide the resulting predicted block to summer 204 to generate residual data and to summer 214 to reconstruct the encoded block for use as a reference picture. Mode select unit 202 may also provide syntax elements, such as motion vectors (coded according to, e.g., merge or AMVP modes), intra-mode indicators, partition information, and other such syntax information, to entropy encoding unit 220.

Motion estimation unit 222 and motion compensation unit 224 may be highly integrated but are illustrated separately for conceptual purposes. Motion estimation, performed by motion estimation unit 222, is the process of generating motion vectors, which estimate motion for video blocks. A motion vector, for example, may indicate the displacement of a PU of a video block within a current video frame or picture relative to a predictive block within a reference picture (or other type of coded unit) relative to the current block being coded within the current frame (or type of other coded unit). A predictive block is a block that is found to closely match the block to be coded, in terms of pixel difference, which may be determined by sum of absolute difference (SAD), sum of square difference (SSD), or other difference metrics. In some examples, video encoder 200 may calculate values for sub-integer pixel positions of reference pictures stored in decoded picture buffer 218. For example, video encoder 200 may interpolate values of one-quarter pixel positions, one-eighth pixel positions, or other fractional pixel positions of the reference picture. Therefore, motion estimation unit 222 may perform a motion search relative to the full pixel positions and fractional pixel positions and output a motion vector with fractional pixel precision.

Motion estimation unit 222 may calculate a motion vector for a block (e.g., a PU in HEVC or a CU in JEM) in an inter-coded slice by comparing the position of the block to the position of a predictive block of a reference picture. The reference picture may be selected from a first reference picture list (List 0) or a second reference picture list (List 1), each of which identify one or more reference pictures stored in decoded picture buffer 218. Motion estimation unit 222 may send information describing the calculated motion vector to entropy encoding unit 220 and motion compensation unit 224.

Motion compensation, performed by motion compensation unit 224, may involve fetching or generating the predictive block based on the motion vector determined by motion estimation unit 222. Upon receiving the motion vector for the PU of the current video block, motion compensation unit 224 may locate the predictive block to which the motion vector points in one of the reference picture lists. Summer 204 may form a residual video block by subtracting pixel values of the predictive block from the pixel values of the current block being coded, forming pixel difference values. In general, motion estimation unit 222 performs motion estimation relative to luma components, and motion compensation unit 224 uses motion vectors calculated based on the luma components for both chroma components and luma components. Mode select unit 202 may also generate syntax elements associated with the video blocks and the video slice for use by video decoder 300 in decoding the video blocks of the video slice.

As described in this disclosure, motion estimation unit 222 and motion compensation unit 224 may perform an AMVP process. Motion estimation unit 222 and motion compensation unit 224 may perform various speedups in accordance with the techniques of this disclosure that may accelerate the encoding process.

Intra-prediction unit 226 may intra-predict a current block, as an alternative to the inter-prediction performed by motion estimation unit 222 and motion compensation unit 224, as described above. In particular, intra-prediction unit 226 may determine an intra-prediction mode to use to encode a current block. In some examples, intra-prediction unit 226 may encode a current block using various intra-prediction modes, e.g., during separate encoding passes, and intra-prediction unit 226 (or mode select unit 202, in some examples) may select an appropriate intra-prediction mode to use from the tested modes.

For example, intra-prediction unit 226 may calculate rate-distortion values using a rate-distortion analysis for the various tested intra prediction modes and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 226 may calculate ratios from the distortions and rates for the various encoded blocks to determine which intra-prediction mode exhibits the best rate-distortion value for the block.

After selecting an intra-prediction mode for a block, intra-prediction unit 226 may provide information indicative of the selected intra-prediction mode for the block to entropy encoding unit 220. Entropy encoding unit 220 may encode the information indicating the selected intra-prediction mode. Video encoder 200 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 200 may form a residual video block by subtracting the prediction data from mode select unit 202 from the original video block being coded. Summer 204 represents the component or components that perform this subtraction operation. Transform processing unit 206 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 206 applies the transform to the residual block, producing a block of transform coefficients. The transform may convert the residual information from a pixel domain to a transform domain, such as a frequency domain. Transform processing unit 206 may send the resulting transform coefficients to quantization unit 208. Quantization unit 208 quantizes the transform coefficients to further reduce bit rate. The quantization process may reduce the bit depth associated with some or all of the coefficients. The degree of quantization may be modified by adjusting a quantization parameter.

Following quantization, entropy encoding unit 220 entropy encodes syntax elements based on the quantized transform coefficients. For example, entropy encoding unit 220 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. Video encoder 200 may generate a bitstream that includes an encoded representation of the video data. The bitstream may include the entropy-encoded syntax elements. The bitstream may be transmitted to another device (e.g., destination device 116) or archived for later transmission or retrieval.

Inverse quantization unit 210 and inverse transform processing unit 212 apply inverse quantization and inverse transformation, respectively, to reconstruct the residual block in the pixel domain. Summer 214 adds the reconstructed residual block to the motion compensated prediction block earlier produced by motion compensation unit 224 or intra-prediction unit 226 to produce a reconstructed video block for storage in decoded picture buffer 218. The reconstructed video block may be used by motion estimation unit 222, motion compensation unit 224, and intra-prediction unit 226 as a reference block to inter-code or intra-code subsequent blocks.

Figure 3:
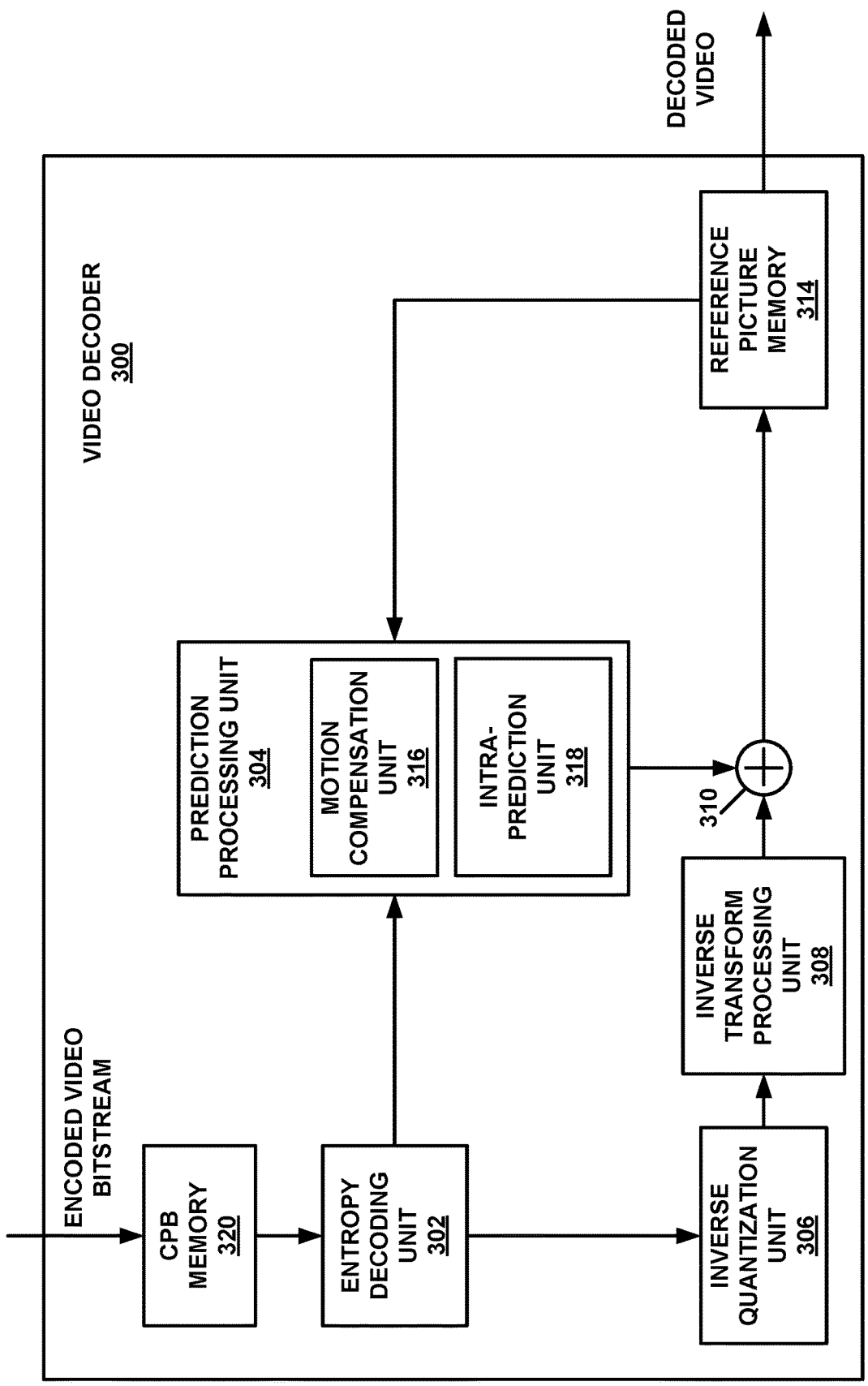
FIG. 3 is a block diagram illustrating an example of a video decoder that may be used with techniques of this disclosure for implementing AMVP speedups.

FIG. 3 is a block diagram illustrating an example of video decoder 300 that may implement techniques of this disclosure for implementing AMVP speedups. In the example of FIG. 3, video decoder 300 includes a coded picture buffer (CPB) memory 320, an entropy decoding unit 302, a prediction processing unit 304, a motion compensation unit 316, an intra prediction unit 318, an inverse quantization unit 306, an inverse transform processing unit 308, reference picture memory 314 and a summer 310. Video decoder 300 may, in some examples, perform a decoding pass generally reciprocal to the encoding pass described with respect to video encoder 200 (FIG. 2). Motion compensation unit 316 may generate prediction data based on motion vectors received from entropy decoding unit 302, while intra prediction unit 318 may generate prediction data based on intra-prediction mode indicators received from entropy decoding unit 302.

Any or all of reference picture memory 314, entropy decoding unit 302, prediction processing unit 304, inverse quantization unit 306, inverse transform processing unit 308, summer 310, filter unit 312, and reference picture memory 314 may be implemented in one or more processors or in processing circuitry. Moreover, video decoder 300 may include additional or alternative processors or processing circuitry to perform these and other functions.

When the video slice is coded as an intra-coded (I) slice, intra prediction unit 318 may generate prediction data for a video block of the current video slice based on a signaled intra prediction mode and data from previously decoded blocks of the current frame or picture. When the video frame is coded as an inter-coded (i.e., B or P) slice, motion compensation unit 316 produces predictive blocks for a video block of the current video slice based on syntax elements received from entropy decoding unit 302. The predictive blocks may be produced from one of the reference pictures within one of the reference picture lists. Video decoder 300 may construct the reference picture lists, List 0 and List 1, using default construction techniques based on reference pictures stored in reference picture memory 82.

During the decoding process, video decoder 300 receives an encoded video bitstream that represents video blocks of an encoded video slice and associated syntax elements from video encoder 200. Entropy decoding unit 302 of video decoder 300 entropy decodes the bitstream to generate quantized coefficients, motion vectors or intra-prediction mode indicators, and other syntax elements. Entropy decoding unit 302 forwards the motion vectors to and other syntax elements to motion compensation unit 316. Video decoder 300 may receive the syntax elements at the video slice level and/or the video block level.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and reference picture memory 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and reference picture memory 314 may be provided by the same memory device or separate memory devices. In various examples, CPB memory 320 and/or reference picture memory 314 may be on-chip with other components of video decoder 300, or off-chip relative to those components.

The syntax elements at the coding tree block (CTB) level may include syntax elements indicating how a CTB is partitioned. For instance, entropy decoding unit 302 may decode one or more syntax elements of a CTB at a region tree level, ultimately yielding one or more region tree leaf nodes. Each region tree leaf node may be associated with corresponding prediction tree syntax elements. The prediction tree syntax elements may indicate how the corresponding region tree leaf node is partitioned, e.g., according to horizontal or vertical binary tree partitioning, horizontal or vertical center-side-triple partitioning, quadtree partition, or asymmetric motion partitioning (AMP). The prediction trees may ultimately yield one or more CUs.

Motion compensation unit 316 determines prediction information for a video block of the current video slice by parsing the motion vectors and other syntax elements and uses the prediction information to produce the predictive blocks for the current video block being decoded. For example, motion compensation unit 316 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 316 may also perform interpolation based on interpolation filters. Motion compensation unit 316 may use interpolation filters as used by video encoder 200 during encoding of the video blocks to calculate interpolated values for sub-integer pixels of reference blocks. In this case, motion compensation unit 316 may determine the interpolation filters used by video encoder 200 from the received syntax elements and use the interpolation filters to produce predictive blocks.

Inverse quantization unit 306 inverse quantizes, i.e., dequantizes, the quantized transform coefficients provided in the bitstream and decoded by entropy decoding unit 302. Inverse transform processing unit 308 applies an inverse transform, e.g., an inverse DCT, an inverse integer transform, or a conceptually similar inverse transform process, to the transform coefficients in order to produce residual blocks in the pixel domain.

After motion compensation unit 316 generates the predictive block for the current block based on the motion vectors and other syntax elements, video decoder 300 forms a decoded block by summing the residual blocks from inverse transform processing unit 308 with the corresponding predictive blocks generated by motion compensation unit 316. Summer 310 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded blocks in a given frame or picture are then stored in reference picture memory 314, which stores reference pictures used for subsequent motion compensation. Reference picture memory 314 also stores decoded video for later presentation on a display device, such as display device 118 of FIG. 1.

In this manner, video decoder 300 of FIG. 3 represents an example of a video decoder including a memory configured to store video data; and a processor implemented in circuitry and configured to perform the techniques disclosed herein.

With respect to motion information, for each block, a set of motion information can be available. A set of motion information contains motion information for forward and backward prediction directions. Here forward and backward prediction directions are two prediction directions of a bi-directional prediction mode and the terms "forward" and "backward" do not necessarily have a geometry meaning; instead they correspond to reference picture list 0 (RefPicList0) and reference picture list 1 (RefPicList1) of a current picture. When only one reference picture list is available for a picture or slice, only RefPicList0 is available and the motion information of each block of a slice is always forward.

For each prediction direction, the motion information must contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component.

Figure 4:
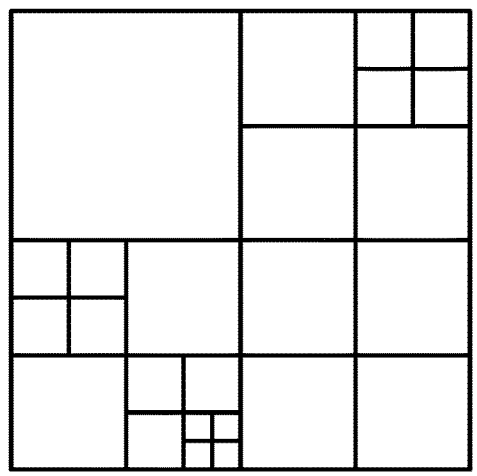
FIG. 4 is a conceptual diagram illustrating an example of coding unit (CU) structure in High Efficiency Video Coding (HEVC).

With respect to CU structure, the largest coding unit in a slice is called a coding tree block (CTB). A CTB contains a quad-tree the nodes of which are coding units. The size of a CTB can be in ranges from 16×16 to 64×64 in the HEVC main profile (although technically 8×8 CTB sizes can be supported). FIG. 4 is a conceptual diagram illustrating an example of coding unit (CU) structure in HEVC. A CTB may be recursively split into CUs in a quad-tree manner, such as shown in FIG. 4. See e.g., W. J. Han et al., "Improved Video Compression Efficiency Through Flexible Unit Representation and Corresponding Extension of Coding Tools," IEEE Transaction on Circuits and Systems for Video Technology, vol. 20, no. 12, pp. 1709-1720, December 2010.

Although a CU can be the same size as a CTB, a CU can be as small as 8×8 or another size. In some examples, each CU may be coded with either intra mode or inter mode. When a CU is inter-coded (i.e., inter mode is applied), the CU may be further partitioned into 2 or 4 PUs or become just one PU when further partition does not apply. When two PUs are present in one CU, the PUs can be half-size rectangles or two unequally-sized rectangles with ¼ or ¾ size of the CU.

Figure 5:
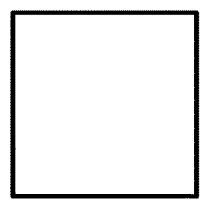
FIG. 5 is a conceptual diagram illustrating example partition modes for an inter prediction mode.
Figure 5:
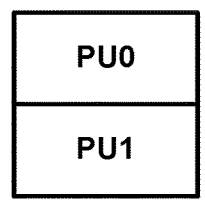
Figure 5:
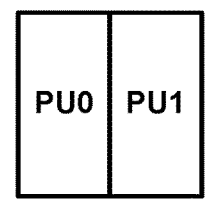
Figure 5:
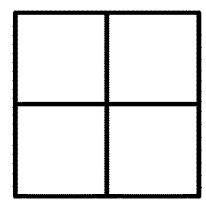
Figure 5:
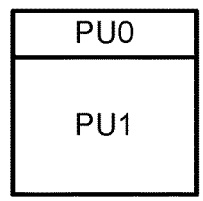
Figure 5:
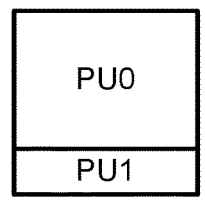
Figure 5:
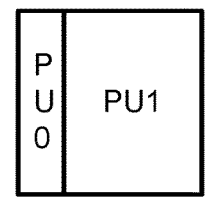
Figure 5:
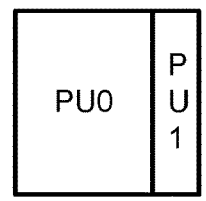

FIG. 5 is a conceptual diagram illustrating example partition modes for an inter prediction mode. There are eight partition modes for a CU coded with inter prediction mode, i.e., PART_2N×2N, PART_2N×N, PART_N×2N, PART_N×N, PART_2N×nU, PART_2N×nD, PART_nL×2N and PART_nR×2N, as shown in the example of FIG. 5.

When the CU is inter-coded, one set of motion information is present for each PU. In addition, each PU is coded with one inter-prediction mode to derive the set of motion information. When a CU is intra coded, 2N×2N and N×N are the only permissible PU shapes, and within each PU a single intra prediction mode is coded (while chroma prediction mode is signaled at CU level). The N×N intra PU shapes are only allowed when the current CU size is equal to the smallest CU size defined in a SPS. In other codecs, such as JEM, a CU is not split into PUs.

With respect to quad-tree-binary-tree structure, in VCEG proposal COM16-C966, a quad-tree-binary-tree (QTBT) was proposed for future video coding standard beyond HEVC. See e.g., J. An et al., "Block partitioning structure for next generation video coding," International Telecommunication Union, COM16-C966, September 2015. Simulations showed the proposed QTBT structure was more efficient than the quad-tree structure in used HEVC.

In the proposed QTBT structure, a CTB is firstly partitioned by quad-tree, where the quad-tree splitting of one node can be iterated until the node reaches the minimum allowed quad-tree leaf node size (MinQTSize). If the quad-tree leaf node size is not larger than the maximum allowed binary tree root node size (MaxBTSize), it can be further partitioned by a binary tree. The binary tree splitting of one node can be iterated until the node reaches the minimum allowed binary tree leaf node size (MinBTSize) or the maximum allowed binary tree depth (MaxBTDepth). The binary tree leaf node is namely CU which will be used for prediction (e.g. intra-picture or inter-picture prediction) and transform without any further partitioning. There are two splitting types (symmetric horizontal splitting and symmetric vertical splitting) in the binary tree splitting.

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quad-tree leaf nodes may have a size from 16×16 (i.e., the MinQTSize) to 128×128 (i.e., the CTU size). If the leaf quad-tree node is 128×128, it will not be further split by the binary tree since the size exceeds the MaxBTSize (i.e., 64×64). Otherwise, the leaf quad-tree node will be further partitioned by the binary tree. Therefore, the quad-tree leaf node is also the root node for the binary tree and has the binary tree depth as 0. When the binary tree depth reaches MaxBTDepth (i.e., 4), it implies that no further splitting is to be performed. When the binary tree node has width equal to MinBTSize (i.e., 4), it implies that no further horizontal splitting is to be performed. Similarly, when the binary tree node has height equal to MinBTSize, it implies that no further vertical splitting is to be performed. The leaf nodes of the binary tree are namely CUs further processed by prediction and transform without any further partitioning.

Figure 6A:
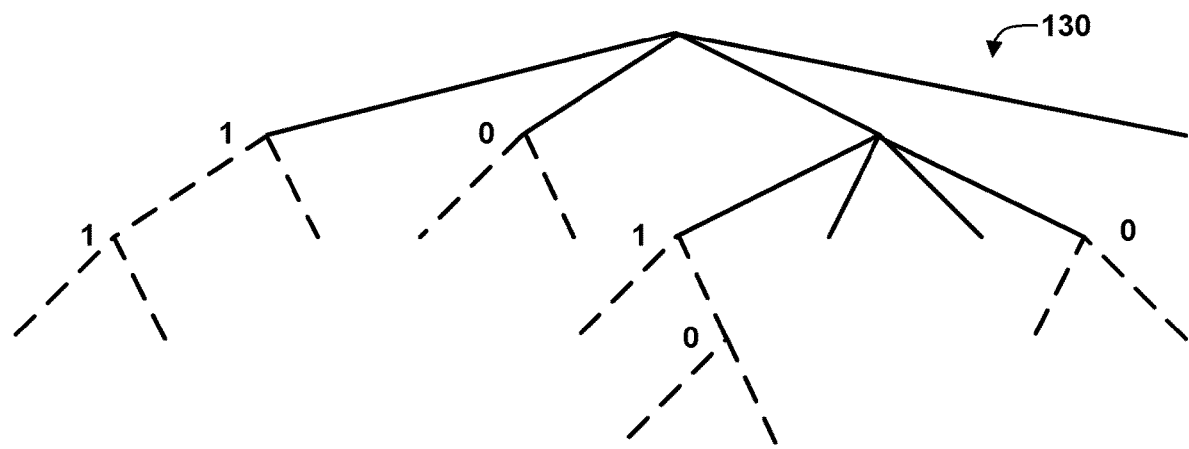
FIG. 6A and FIG. 6B are conceptual diagrams illustrating examples of block partitioning using a quadtree-binary tree (QTBT) tree structure and a corresponding tree structure.
Figure 6B:
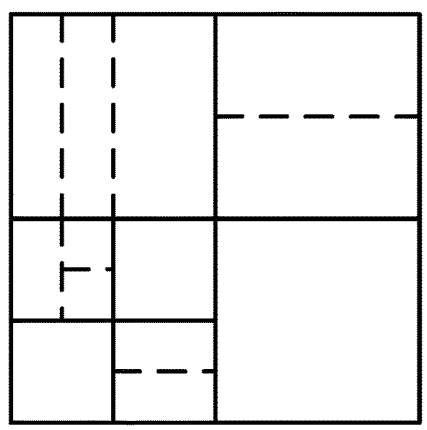

FIG. 6A illustrates an example of block partitioning by using QTBT, and FIG. 6B illustrates the corresponding tree structure. The solid lines indicate quad-tree splitting and dotted lines indicate binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting. For the quad-tree splitting, there is no need to indicate the splitting type since it always split a block horizontally and vertically into 4 sub-blocks with an equal size.

An example multi-type-tree (MTT) structure is described in U.S. Patent Publication No. 2017/0208336 (application Ser. No. 15/404,634) and U.S. Patent Publication No. 2017/0272782 (application Ser. No. 15/463,398). In an MTT structure, a tree node may be further split with multiple tree types, such as binary tree, a symmetric center-side triple tree, and a quad-tree. It is understood that simulations have shown that the multi-type-tree structure was much more efficient than quad-tree-binary-tree structure.

Figure 7:
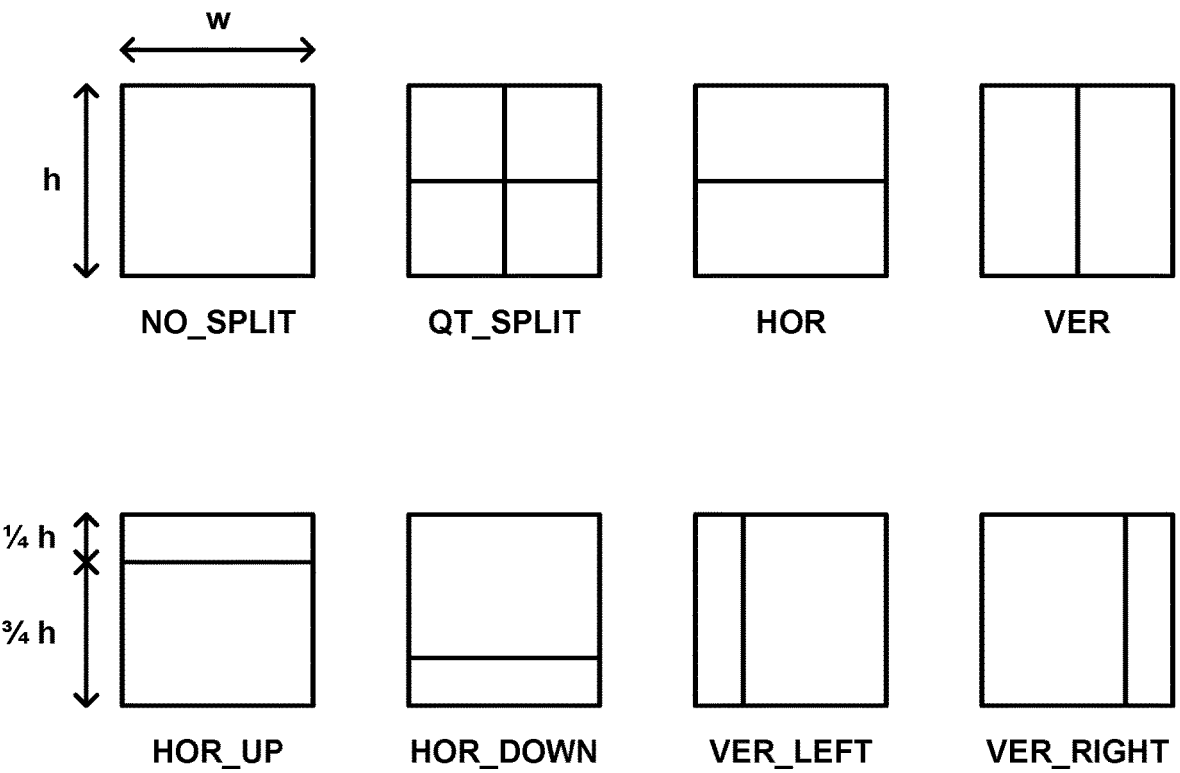
FIG. 7 is a conceptual diagram illustrating an example set of CU splitting modes available in a coding scheme.

F. Le Léannec, T. Poirier, F. Urban, "Asymmetric Coding Units in QTBT", JVET-D0064, Chengdu, October 2016 (hereinafter, "JVET-D0064"), described asymmetric CU on top of QTBT. Four new binary tree splitting modes have been introduced into the QTBT framework, so as to allow new splitting configurations. So-called asymmetric splitting modes are proposed in addition to the splitting modes already available in QTBT, as shown by FIG. 7. FIG. 7 is a conceptual diagram illustrating a set of CU splitting modes available in a coding scheme, such as the coding scheme described in JVET-D0064. According to the added splitting, a CU with size S is divided into 2 sub-CU with sizes S/4 and 3*S/4, either in the horizontal or in the vertical direction. In JVET-D0064, the newly added CU width or height could only be 12 or 24.

In JEM, local illumination compensation (LIC) was developed based on a linear model for illumination changes, using a scaling factor a and an offset b. See e.g., H. Liu et al., "Local illumination compensation", ITU—Telecommunications Standardization Sector Study Group 16, Question 6, Video Coding Experts Group (VCEG), 52$^{nd}$ Meeting, 19-26 Jun. 2015, Warsaw, Poland, document no. VCEG-AZ06. Local illumination compensation can be enabled or disabled based on the flag of each inter-mode CU.

When LIC is applied to a CU, a predicted signal in direction k is generated by $$\text{pred}_{LIC}(i,j,k) = a \cdot \text{pred}(i,j,k) + b \quad (1)$$

where $\text{pred}_{LIC}(i,j,k)$ represents the finally predicted signal in reference list k (k=0 or 1) and pred(i,j,k) represents the predicted signal based on some inter-prediction information such as reference index and motion vector from reference list k. A video coder (e.g., video encoder 200 or video decoder 300) may derive parameters a and b by minimizing regression error between neighboring reconstructed and predicted samples around current block.

In JEM, video encoder 200 may signal a slice-level flag called SLICE_LIC_ENABLE that enables video decoder 300 to determine whether LIC can be applied to blocks in a slice. To determine a value of the SLICE_LIC_ENABLE flag, video encoder 200 may calculate histograms of a current picture and every reference picture of the current picture. A histogram for a picture may plot the number of samples in the picture for each value. To determine a histogram difference between two pictures, video encoder 200 may, for each sample value, determine a difference between the numbers of samples in the two pictures that have the sample value. If the histogram differences between the current picture and every reference picture of the current picture are all less than a given threshold, video encoder 200 may disable LIC for the current picture (e.g., video encoder 200 may set the SLICE_LIC_ENABLE flag as false). Otherwise, video encoder 200 may enable LIC for the current picture (e.g., video encoder 200 sets SLICE_LIC_ENABLE as true). If the SLICE_LIC_ENABLE flag is true, video encoder 200 may signal a LIC flag of a CU or video decoder 300 may infer the LIC flag for a CU from neighboring blocks. The LIC flag for a CU indicates whether LIC is applied in the CU.

With respect to motion prediction, there are two inter prediction modes used in the HEVC standard, named merge mode (skip is considered as a special case of merge) and advanced motion vector prediction (AMVP) mode, respectively, for a PU. In either AMVP mode or merge mode, both video encoder 200 and video decoder 300 maintain a motion vector (MV) candidate list for multiple motion vector predictors. The motion vector(s), as well as reference indices in the merge mode, of the current PU are generated by taking one candidate from the MV candidate list.

In some examples, the MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, a video coder (e.g., video encoder 200 or video decoder 300) may use the reference pictures for the prediction of the current block, as well as the associated motion vectors are determined. However, under AMVP mode, video encoder 200 signals motion information (e.g., prediction direction (either uni-directional prediction or bi-directional prediction), reference list index (not signaled for bi-directional prediction), reference picture index in the used reference list, and motion vector information).

Figure 8:
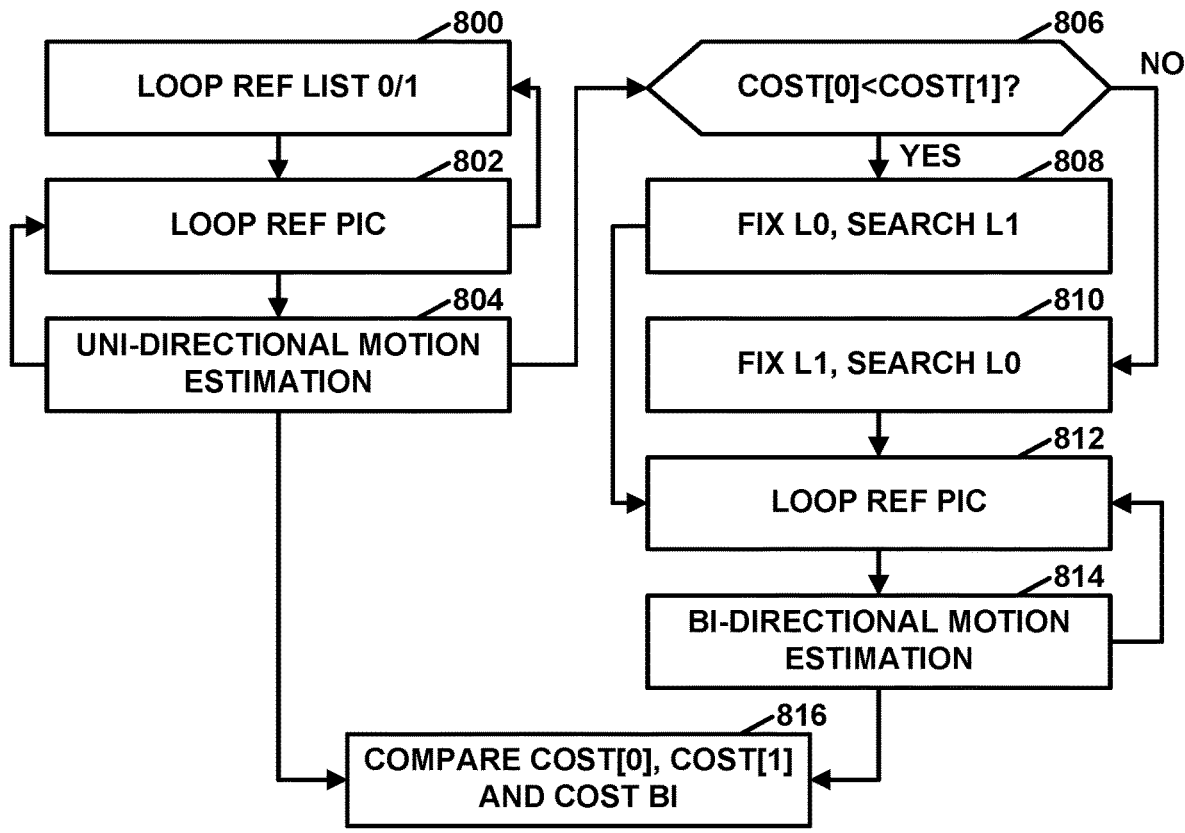
FIG. 8 is a flowchart illustrating an example motion procedure for AMVP mode.

FIG. 8 is a flowchart illustrating an example motion procedure for AMVP mode. The example of FIG. 8 shows a procedure for how to derive a block's AMVP motion information at the encoder side. Particularly, in the example of FIG. 8, video encoder 200 performs a first loop (labeled "LOOP REF LIST 0/1" in FIG. 8) (800). Each iteration of the first loop corresponds to a different reference picture list of reference picture list 0 and reference picture list 1. Thus, in some examples, a first iteration of the first loop may correspond to reference picture list 0 and a second iteration of the first loop may correspond to reference picture list 1.

During an iteration of the first loop that corresponds to a particular reference picture list, video encoder 200 performs a second loop (labeled "LOOP REF PIC" in FIG. 8) (802). Each iteration of the second loop corresponds to a different reference picture in the particular reference picture list. For each iteration of the second loop, video encoder 200 performs uni-directional motion estimation using the reference picture corresponding to the current iteration of the second loop in the current reference picture list (i.e., the reference picture list corresponding to the current iteration of the first loop) (804).

When video encoder 200 performs uni-directional motion estimation using a current reference picture of the current reference picture list, video encoder 200 may determine costs for encoding the current block using a set of uni-directional motion hypotheses for the current reference picture. The uni-directional motion hypotheses for the current reference picture may indicate predictive blocks based on the current reference picture. Additionally, in some examples, a uni-directional motion hypothesis for the current reference picture may indicate a candidate in an AMVP candidate list for the current block.

Furthermore, video encoder 200 may determine a lowest-cost uni-directional motion hypothesis for the current picture. The lowest-cost uni-directional motion hypothesis for the current picture is the uni-directional motion hypothesis for the current picture that has a lowest cost. At the end of the second loop (804), video encoder 200 may determine a lowest-cost uni-directional motion hypothesis for the current reference picture list. The lowest-cost uni-directional motion hypothesis for the current reference picture list may be a uni-directional motion hypothesis among the lowest-cost uni-directional motion hypotheses for the reference pictures of the current reference picture list that has a lowest cost.

Thus, after completing the first loop (802), video encoder 200 has determined a lowest-cost uni-directional motion hypothesis for reference picture list 0 and a lowest-cost uni-directional motion hypothesis for reference picture list 1. In the example of FIG. 8, the cost for encoding the current block using the lowest-cost uni-directional motion hypothesis for reference picture list 0 is denoted COST[0] and the cost for encoding the current block using the lowest-cost uni-directional motion hypothesis for reference picture list 1 is denoted COST[1].

Furthermore, in the example of FIG. 8, after determining COST[0] and COST[1], video encoder 200 may determine whether COST[0] is less than COST[1] (806). If video encoder 200 determines that COST[0] is less than COST[1] ("YES" branch of 806), video encoder 200 may determine that reference picture list 0 is a fixed reference picture list and reference picture list 1 is a non-fixed reference picture list (808). Conversely, if video encoder 200 determines that COST[0] is not less than COST[1] ("NO" branch of 806), video encoder 200 may determine that reference picture list 1 is the fixed reference picture list and reference picture list 0 is the non-fixed reference picture list (810). Video encoder 200 may search the non-fixed reference picture list. A reference picture list is fixed in the sense that video encoder 200 does not search for a block in any reference picture of the fixed reference picture list when performing a bi-directional motion estimation process.

After determining which of the reference picture lists is the fixed reference picture list and which of the reference picture lists is the non-fixed reference picture list, video encoder 200 may perform a third loop that iterates through reference pictures in the non-fixed reference picture list (812). Each iteration of the third loop may correspond to a different reference picture in the non-fixed reference picture list. This disclosure may refer to a reference picture in the non-fixed reference picture list as a non-fixed reference picture. During each iteration of the third loop, video encoder 200 may perform bi-directional motion estimation using a non-fixed reference picture corresponding to the current iteration of the third loop (814).

As part of performing bi-directional motion estimation using a non-fixed reference picture, video encoder 200 may determine costs for encoding the current block using a set of bi-directional motion hypotheses for the non-fixed reference picture. Each of the bi-directional motion hypotheses for the non-fixed reference picture specifies the lowest-cost uni-directional motion hypothesis for the fixed reference picture list determined in action 804 and a different uni-directional motion hypothesis for the non-fixed reference picture. Different uni-directional motion hypotheses for the non-fixed reference picture may indicate different combinations of blocks in the non-fixed reference picture and candidates in an AMVP candidate list for the current block.

To determine a cost for encoding the current block using a bi-directional motion hypothesis for the non-fixed reference picture, video encoder 200 may generate a predictive block based on a block indicated by the lowest-cost uni-directional motion hypothesis for the fixed reference picture list and a block indicated by the current uni-directional motion hypothesis for the non-fixed reference picture. For instance, video encoder 200 may generate the predictive block such that each sample of the predictive block is equal to a weighted average of corresponding samples in the block indicated by the lowest-cost uni-directional motion hypothesis for the fixed reference picture list and the block indicated by the current uni-directional motion hypothesis for the non-fixed reference picture. After generating the predictive block, video encoder 200 may use the predictive block in determining a cost in the same manner as described elsewhere in this disclosure.

After iterating through each reference picture in the non-fixed reference picture list, video encoder 200 may determine a bi-directional cost (labeled, "COST BI" in FIG. 8). The bi-directional cost may be the lowest cost among the costs for encoding the current block using bi-directional motion hypotheses for non-fixed reference pictures in the non-fixed reference picture list.

Furthermore, in the example of FIG. 8, video encoder 200 may compare COST[0], COST[1], and COST BI (816). Video encoder 200 may select an AMVP mode based on the comparison of COST[0], COST[1] and COST BI. For example, if COST[0] is the lowest among COST[0], COST[1], and COST BI, video encoder 200 may select a lowest-cost uni-directional motion hypothesis for reference picture list 0. If COST[1] is the lowest among COST[0], COST[1], and COST BI, video encoder 200 may select a lowest-cost uni-directional motion hypothesis for reference picture list 1. If COST BI is the lowest among COST[0], COST[1], and COST BI, video encoder 200 may select a lowest-cost bi-directional motion hypothesis.

If local illumination compensation is enabled for a slice that contains the current block, video encoder 200 may perform the operation of FIG. 8 twice: once for the case in which LIC is applied and once for the case in which LIC is not applied. When performing the AMVP process, video encoder 200 may perform a uni-directional motion estimation process for one or more reference picture lists of the current picture (e.g., as described above with respect to (804)). When performing the uni-directional motion estimation process for a reference picture list, video encoder 200 evaluates a set of uni-directional motion hypotheses that indicate predictive blocks based on samples in reference pictures in the reference picture list.

When video encoder 200 evaluates a uni-directional motion hypothesis, video encoder 200 may compare the predictive block indicated by the uni-directional motion hypothesis to the current block to determine a cost for the uni-directional motion hypothesis. Additionally, video encoder 200 may perform a bi-directional motion estimation process (e.g., as described above with respect to (814)). When performing the bi-directional motion estimation process, video encoder 200 evaluates a set of bi-directional motion hypotheses. Each of the bi-directional motion hypotheses indicates a predictive block generated based on predictive blocks indicated by uni-directional motion hypotheses for the first and second reference picture lists. Furthermore, when evaluating a bi-directional motion hypothesis, video encoder 200 may compare the predictive block corresponding to the bi-directional motion hypothesis to the current block to determine a cost for the bi-directional motion hypothesis. Video encoder 200 may select a uni-directional or bi-directional motion hypothesis with the lowest cost.

During the pass through the AMVP process in which LIC is applied, video encoder 200 uses LIC to modify the predictive blocks indicated by the motion hypotheses (e.g., uni-directional motion hypotheses and bi-directional motion hypotheses). For instance, video encoder 200 may use equation (1) to modify the prediction blocks. Video encoder 200 may then determine costs for the motion hypotheses based on a comparison of the modified predictive blocks and the current block. During the pass through the AMVP process in which LIC is not applied, video encoder 200 does not use LIC to modify the predictive blocks prior to determining the costs for the motion hypotheses.

After video encoder 200 completes a pass of through the AMVP process for the current block, video encoder 200 may apply a transform process (e.g., as described above with respect to transform processing unit 206), a quantization (e.g., as described above with respect to quantization unit 208), and an entropy encoding process (e.g., as described above with respect to entropy encoding unit 220). Video encoder 200 may use the resulting data generated by the entropy encoding process to compute a rate. Additionally, video encoder 200 may reconstruct the block and compare the reconstructed block to the original block to determine a distortion level. Video encoder 200 may determine a rate-distortion (RD) cost based on the rate and distortion level. For instance, the rate-distortion (RD) cost may be a ratio of the rate to the distortion level.

The whole procedure of encoding the block in multiple ways and determining RD costs may be referred to a RD checking. Thus, after completing both passes through the AMVP process for the current block, video encoder 200 may generate two RD costs: one for the case in which LIC is applied in the AMVP process and one for the case in which LIC is not applied in the AMVP process. In other words, video encoder 200 may compute RD costs with LIC on and off. Video encoder 200 may also generate similar RD costs for other inter prediction modes, such as merge mode and affine mode. In addition, video encoder 200 may generate an RD cost for intra prediction. Video encoder 200 (e.g., mode select unit 202 of FIG. 2) may use the RD cost to determine whether to encode the current block a mode in which LIC is applied in the AMVP process, a mode in which LIC is not applied in the AMVP process, another inter prediction mode, or an intra prediction mode.

In JEM, video encoder 200 may signal a LIC flag for a block encoded with AMVP mode. In some examples, when LIC is off (i.e., when LIC is not enabled for the block), video encoder 200 may use a sum of absolute difference (SAD) as the metric in motion estimation (ME). In other words, during the pass through the AMVP process in which video encoder 200 does not apply LIC, video encoder 200 may use a sum of absolute differences between the current block and the predictive block indicated by a motion hypothesis as the cost for the motion hypothesis. In some such examples, when LIC is on, video encoder 200 uses mean-removed SAD as a metric in motion estimation. To determine a mean-removed SAD, video encoder 200 may determine a first mean of sample values in the predictive block, subtract the first mean from the sample values in the predictive block, determine a second mean of sample values in the current block, subtract the second mean from the sample values in the current block, and calculate the SAD based on the resulting sample values of the predictive block and the current block. In other words, during the pass through the AMVP process in which video encoder 200 applies LIC, video encoder 200 may use a mean-removed sum of absolute differences between the current block and the predictive block indicated by a motion hypothesis as the cost for the motion hypothesis. As noted above, to determine whether LIC is ultimately applied in the current block as-encoded, video encoder 200 may check RD costs both with LIC on and with LIC off.

In current existing video codec standards, such as H.264/AVC and H.265/HEVC, only a translational motion model is applied for motion compensation prediction (MCP). In the real world, however, there are many other kinds of motions, such as zoom in/out, rotation, perspective motions, and the other irregular motions. Applying only a translation motion model for MCP in test sequences with irregular motions may affect prediction accuracy and may be expected to result in low coding efficiency. For many years, video experts have tried to design algorithms to improve MCP for higher coding efficiency. Affine motion models are one way to model non-translational motion. If a block is coded using an affine motion model, a video coder may determine a motion vector for each position (x, y) in a block. In one example, video coders may use an affine motion model with 4 parameters such as:

$$\begin{cases} mv_x = ax - by + c \\ mv_y = bx + ay + d \end{cases} \qquad (2)$$

In the set of equations above, $mv_x$ is a horizontal component of a motion vector for a position (x, y) in a block; $mv_y$ is a vertical component of the motion vector for the position (x, y) in the block; and a, b, c, and d are parameters. The motion vector for positions in a block may be considered to be an affine motion field of the block.

Figure 9:
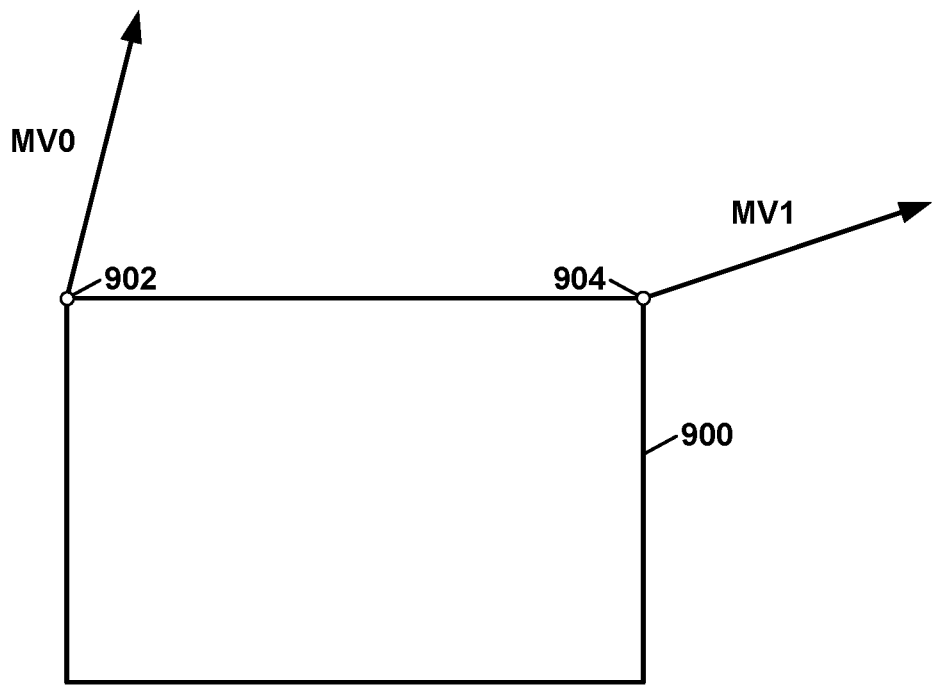
FIG. 9 illustrates an example simplified affine motion model for a current block.

FIG. 9 illustrates an example simplified affine motion model for a current block 900. As shown in FIG. 9, an affine motion field of the block is described by two control point motion vectors MV0 and MV1. MV0 is a control point motion vector for a top-left control point 902 of current block 900. MV1 is a control point motion vector for a top-right control point 904 of current block 900. Thus, rather than signaling separate motion vectors for each position in a block, video encoder 200 may instead signal motion vectors for control point 902 and control point 904.

In some examples, a video coder may use the following set of equations to determine the motion vector for a position in the block based on the motion vectors for the control points:

$$\begin{cases} mv_x = \dfrac{(mv_{1x} - mv_{0x})}{w}x - \dfrac{(mv_{1y} - mv_{0y})}{w}y + mv_{0x} \\ mv_y = \dfrac{(mv_{1y} - mv_{0y})}{w}x + \dfrac{(mv_{1x} - mv_{0x})}{w}y + mv_{0y} \end{cases} \quad (3)$$

In the set of equations above, $mv_x$ is a horizontal component of a motion vector for a position (x, y) in the block, $mv_y$ is a vertical component of the motion vector for the position (x, y) in the block, $mv_{0x}$ is a horizontal component of a motion vector for a first control point (e.g., control point 902), $mv_{0y}$ is a vertical component of the motion vector for the first control point, $mv_{1x}$ is a horizontal component of a motion vector for a second control point (e.g., control point 904), $mv_{1y}$ is a vertical component of the motion vector for the second control point, and w is the width of the block. In some examples, the affine motion prediction is only applied to square blocks. In other examples, the affine motion prediction can be applied to non-square blocks.

In designs where one or more of LIC or affine prediction is enabled with inter prediction, video encoder 200 is found to spend much more time to perform RD checking to choose the best mode. For example, when video encoder 200 can apply LIC to a block's AMVP mode (i.e., when video encoder 200 encodes the block using LIC and AMVP), video encoder 200 may compute RD costs with LIC on and off. As discussed elsewhere in this disclosure, computing such RD costs may consume energy and may slow down the encoding process.

The techniques of this disclosure may be applied to overcome these or other such challenges. For example, this disclosure describes LIC speed-ups for AMVP techniques. The LIC speed-ups may be applied individually or in any combination.

As disclosed herein, a video coder (e.g., video encoder 200 or video decoder 300) can apply LIC to skip, merge and AMVP modes for an inter-coded CU. In other words, an inter-coded CU may be encoded using LIC and skip, merge, or AMVP modes. In some examples, to skip unnecessary RD checking for AMVP mode, video encoder 200 may signal a slice-level flag called SLICE_LIC_AMVP_ENABLE that may enable video decoder 300 to determine whether LIC can be applied to AMVP mode in a slice.

As discussed elsewhere in this disclosure, video encoder 200 may signal a slice-level SLICE_LIC_ENABLE flag that indicates whether LIC can be applied to blocks in a slice. When the SLICE_LIC_ENABLE flag for a slice has a value of true, blocks in the slice may be encoded using LIC. In some examples, video encoder 200 only signals the SLICE_LIC_AMVP_ENABLE flag for a slice when a SLICE_LIC_ENABLE flag for the slice is true.

When the SLICE_LIC_AMVP_ENABLE flag for a slice is false, video encoder 200 may skip RD checking for AMVP with LIC on and video encoder 200 does not signal a LIC flag for a CU with AMVP mode. For instance, when encoding a current block of a slice and the SLICE_LIC_AMVP_ENABLE flag for the slice is false, video encoder 200 may skip the pass through the AMVP process in which LIC is applied. Thus, if the SLICE_LIC_AMVP_ENABLE flag for a slice indicates that blocks of the slice encoded in AMVP mode cannot be encoded with LIC.

At the decoder side, when the SLICE_LIC_AMVP_ENABLE flag for a slice is false, an LIC flag of a CU in the slice is set as false with AMVP mode. That is, video decoder 300 does not perform LIC for motion compensation with AMVP mode if the SLICE_LIC_AMVP_ENABLE flag is false. In other words, when the SLICE_LIC_AMVP_ENABLE flag is false and the CU is encoded using AMVP mode, video decoder 300 may determine that the CU is not encoded using LIC even though video decoder 300 did not explicitly receive a LIC flag for the CU.

In some examples where the slice-level SLICE_LIC_ENABLE flag is signaled in a first slice of a picture, the SLICE_LIC_ENABLE flag is applicable to all slices in the picture. Similarly, in some examples, where the SLICE_LIC_AMVP_ENABLE flag is signaled in the first slice of a picture, the SLICE_LIC_AMVP_ENABLE flag is applicable to all slices in the picture.

Video encoder 200 may determine whether to set the SLICE_LIC_AMVP_ENABLE flag for a slice to true or false. There are many ways to determine whether to set the SLICE_LIC_AMVP_ENABLE flag to true or false. For instance, in one example, the SLICE_LIC_AMVP_ENABLE flag for a slice may depend on a temporal layer id (TiD) of the slice or a temporal distance between a current picture (i.e., a picture that contains the slice) and a reference picture of the current picture under certain configurations, such as random access. An example is given in FIG. 10.

Figure 10:
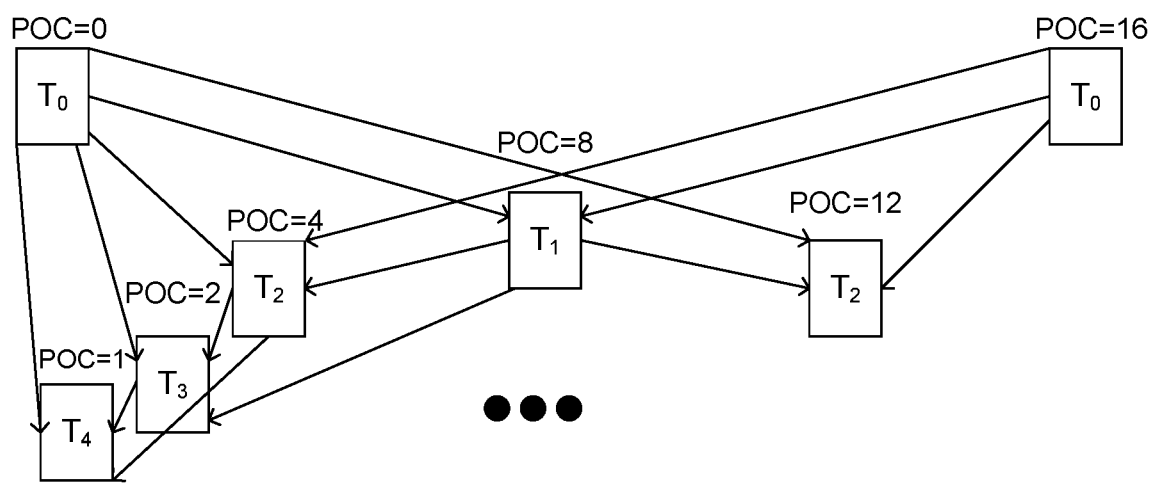
FIG. 10 is a conceptual diagram illustrating an example of a random-access configuration with a group of pictures (GOP) size equal to 16.

FIG. 10 is a conceptual diagram illustrating an example of a random-access configuration with a group of pictures (GOP) size equal to 16. In the example of FIG. 10, the rectangles correspond to pictures in the GOP. Furthermore, in the example of FIG. 10, five temporal layers are supported, which are indicated by $T_0$ to $T_4$. Each of the pictures is associated with a Picture Order Count (POC) value that indicates an order of output of the pictures, which may differ from the order in which the pictures are encoded and decoded. In the example of FIG. 10, the encoding/decoding order of pictures is: POC 0', POC 16', POC 8'', POC 4''', POC 2'''', POC 1''''', POC 3''''', POC 6'''', POC 5''''', POC 7''''', POC 12''', POC 10'''', POC 9''''', POC 11''''', POC 14'''', POC 13''''', and POC 15'''''. Here, different prime counts (prime denotation(')) denote for the POC values of the pictures corresponds to different temporal layers (e.g., POC 4''' and POC 12''' are at the same temporal level).

As noted above, in some examples, the SLICE_LIC_AMVP_ENABLE flag for a slice depends on a temporal layer id (TiD) of the slice. For instance, in one example, when TiD>=x, video encoder 200 sets the SLICE_LIC_AMVP_ENABLE flag as true. Otherwise, video encoder 200 sets the SLICE_LIC_AMVP_ENABLE flag as false. In this example, x is a predefined threshold. In other words, when the temporal distance between the current picture and its closest reference picture is less than or equal to a threshold t (or x), then SLICE_LIC_AMVP_ENABLE is set as false. In some examples, video encoder 200 may signal the threshold t through a VPS, SPS, PPS, or in another parameter set or syntax structure.

In another example, video encoder 200 does not need to signal a SLICE_LIC_AMVP_ENABLE flag. Similar to the example of the previous paragraph, when the temporal distance between the current picture and its closest reference picture (e.g., the reference picture of the current picture that is closest to the current picture in terms of the different in picture index in display order) is less than or equal to a threshold t, all CUs coded with AMVP mode in the current pictures are presumed to be LIC-off. In other words, when the temporal distance between the current picture and the closest reference picture is less than or equal to the threshold t, a video coder (e.g., video encoder 200 or video decoder 300) may infer that no CU of the current picture that is encoded using AMVP is encoded using LIC.

In some examples, video encoder 200 may determine the value of a SLICE_LIC_AMVP_ENABLE flag based on a threshold and average histogram difference between a current slice and every reference picture. A histogram for a picture may plot the number of samples in the picture for each sample value. In other words, the histogram for a picture may indicate how many samples in the picture have value x, how many samples in the picture have value y, etc. Similarly, a histogram for a slice may plot the number of samples in the slice for each sample value. To determine the average histogram difference between the current slice and a reference picture, video encoder 200 may, for each of the sample values, determine a difference between the number of samples in the slice and reference picture that have the sample value, and then determine an average of the differences. If a histogram difference (e.g., a maximum of the average histogram differences between the current slice and the reference pictures, or an average of the average histogram differences between the current slice and the reference pictures) is larger than a threshold, video encoder 200 sets the SLICE_LIC_AMVP_ENABLE flag to a first value, e.g., a value corresponding to true. Otherwise, video encoder 200 sets the SLICE_LIC_AMVP_ENABLE flag to a second values, e.g., a value corresponding to false.

In some examples, video encoder 200 may determine the value of a SLICE_LIC_AMVP_ENABLE flag based on a threshold and histogram in a manner similar to that used to determine the value of a SLICE_LIC_ENABLE flag. For example, the video coder may use a histogram difference (e.g., total histogram difference, average histogram difference, etc.) to determine the value of a SLICE_LIC_AMVP_ENABLE flag. If the histogram difference is larger than a threshold, the video coder may set the SLICE_LIC_AMVP_ENABLE flag to true. Otherwise, in this example, if the histogram difference is not larger than the threshold, the video coder may set the SLICE_LIC_AMVP_ENABLE flag to false. In some examples, the video coder may use the threshold $t_{LIC\_AMVP}$ to determine SLICE_LIC_AMVP_ENABLE flag. The threshold $t_{LIC\_AMVP}$ can be different from the threshold $t_{LIC}$ used to determine the value of the SLICE_LIC_ENABLE flag. In some examples, $t_{LIC\_AMVP}$ is a constant. In other examples, $t_{LIC\_AMVP}$ is variable such as:

$$t_{LIC\_AMVP} = t_{LIC} + \text{TiD}^*y \qquad (4)$$

In the equation above, TiD is a temporal identifier of the current picture and y is a constant.

Figure 11:
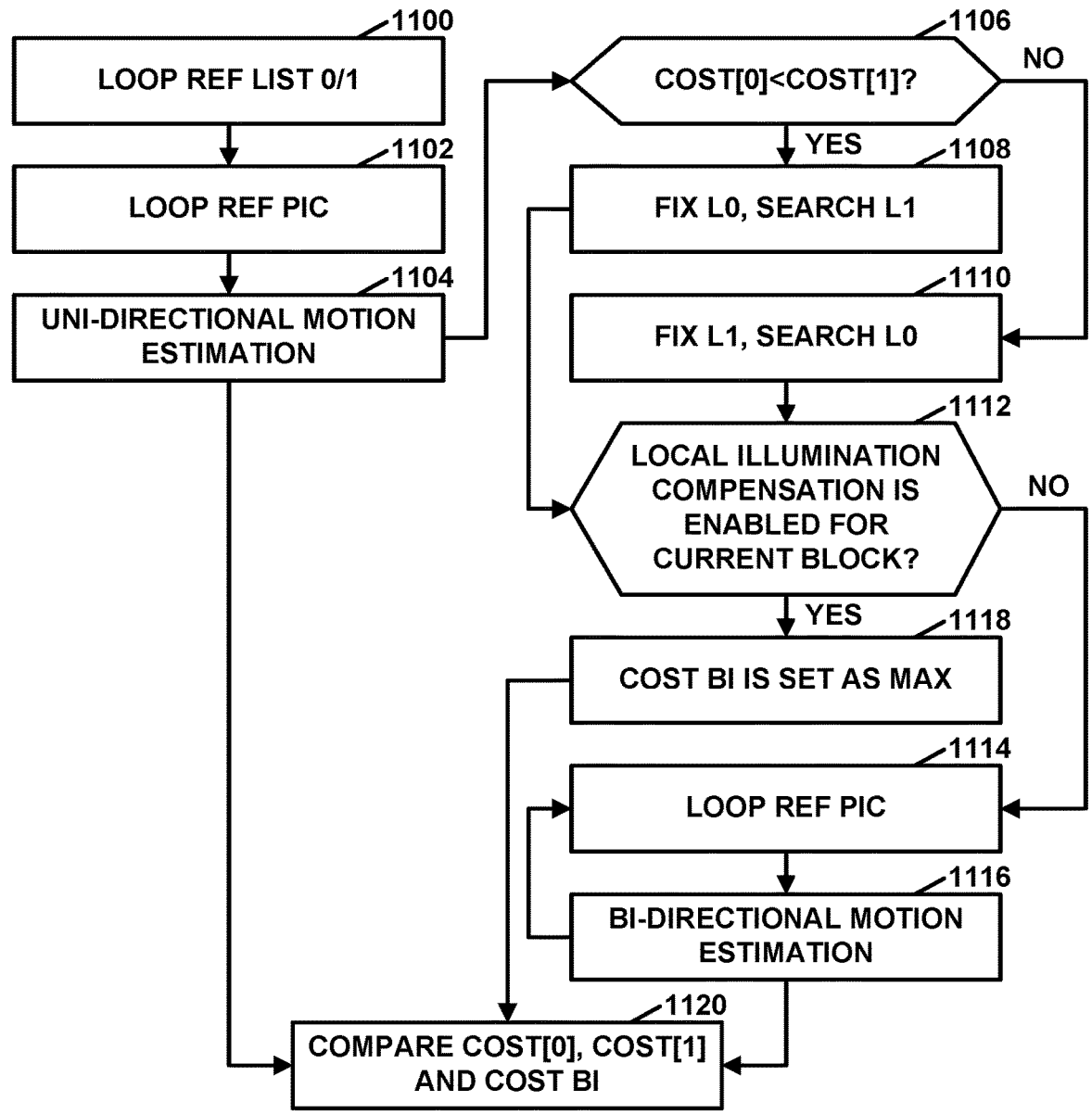
FIG. 11 is a flowchart illustrating an example operation for performing an AMVP operation that disables bi-directional AMVP during a pass through the AMVP process in which local illumination compensation (LIC) is applied.

In JEM, LIC can be applied to both uni-directional AMVP (uni-AMVP) and bi-directional AMVP (bi-AMVP). In accordance with a technique of this disclosure, to skip unnecessary checking for a CU coded with AMVP mode, LIC can only be applied to uni-AMVP mode. As a result of this, the motion prediction procedure in FIG. 8 can be further simplified as shown in FIG. 11. FIG. 11 is an example motion procedure for AMVP mode by disabling LIC=on for Bi-AMVP. In other words, FIG. 11 is a flowchart illustrating an example operation for performing an AMVP operation that disables bi-directional AMVP during a pass through the AMVP process in which LIC is applied. Note that "uni-directional" may also be interpreted as single-hypothesis inter prediction and "bi-directional" may be interpreted as multi-hypothesis inter prediction.

In the example of FIG. 11, actions (1100), (1102), (1104), (1106), (1108), (1110), (1112) may be the same as actions (800), (802), (804), (806), (808), (810) and (812) of FIG. 8. In the example of FIG. 11, in response to determining that local illumination compensation is not enabled for the current block ("NO branch of 1112), video encoder 200 may perform a third loop that iterates through reference pictures in the non-fixed reference picture list (1114). Each iteration of the third loop may correspond to a different reference picture in the non-fixed reference picture list. This disclosure may refer to a reference picture in the non-fixed reference picture list as a non-fixed reference picture. During each iteration of the third loop, video encoder 200 may perform bi-directional motion estimation using a non-fixed reference picture corresponding to the current iteration of the third loop (1116).

As part of performing bi-directional motion estimation using a non-fixed reference picture, video encoder 200 may determine costs for bi-directional motion hypotheses for the non-fixed reference picture. Each of the bi-directional motion hypotheses for the non-fixed reference picture specifies the lowest-cost uni-directional motion hypothesis for the fixed reference picture list determined in action (1104) and a different uni-directional motion hypothesis for the non-fixed reference picture. Different uni-directional motion hypotheses for the non-fixed reference picture may indicate different combinations of blocks in the non-fixed reference picture and candidates in an AMVP candidate list for the current block.

Video encoder 200 may then determine a lowest-cost bi-directional motion hypothesis for the non-fixed reference picture. The lowest-cost bi-directional motion hypothesis for the non-fixed reference picture may be the bi-directional motion hypothesis for the non-fixed reference picture that has a lowest cost. Video encoder 200 may then determine an overall lowest-cost bi-directional motion hypothesis. The overall lowest-cost motion hypothesis may be whichever of the lowest-cost bi-directional motion hypotheses for non-fixed reference pictures has the lowest cost. Video encoder 200 may set COST BI to a cost for the overall lowest-cost bi-directional motion hypothesis.

In the example of FIG. 11, in response to determining that LIC is being applied in the AMVP process ("YES" branch of 1112), video encoder 200 may set COST BI to a maximum cost value (1118). Setting COST BI to the maximum cost value may ensure that video encoder 200 does not use bi-directional AMVP to encode the current block. Thus, bi-directional AMVP may be effectively disabled for the current block if local illumination compensation is enabled for the current block. In this way, video encoder 200 may skip the bi-directional AMVP motion estimation process of actions 1114 and 1116 that sets COST BI to be a cost associated with encoding the current block using a bi-directional AMVP mode.

Furthermore, in the example of FIG. 11, after setting COST BI in action 1118 or in actions 1114 and 1116, video encoder 200 may compare COST[0], COST[1], and COST BI to determine which of COST[0], COST[1], and COST BI is the lowest (1120). Video encoder 200 may select uni-directional AMVP based on reference picture list 0 if COST[0] is lower than COST[1] and COST BI. Video encoder 200 may select uni-directional AMVP based on reference picture list 1 if COST[1] is lower than COST[0] and COST BI. Video encoder 200 may select bi-directional AMVP mode if COST BI is lower than COST[0] and COST[1]. Video encoder 200 may then apply RD checking for the selected AMVP mode. Video encoder 200 may repeat the process of FIG. 11 with LIC being applied in the AMVP process and without LIC being applied in the AMVP process. Thus, video encoder 200 may select two AMVP modes and determine a separate RD cost for each of the two selected AMVP modes.

Figure 12:
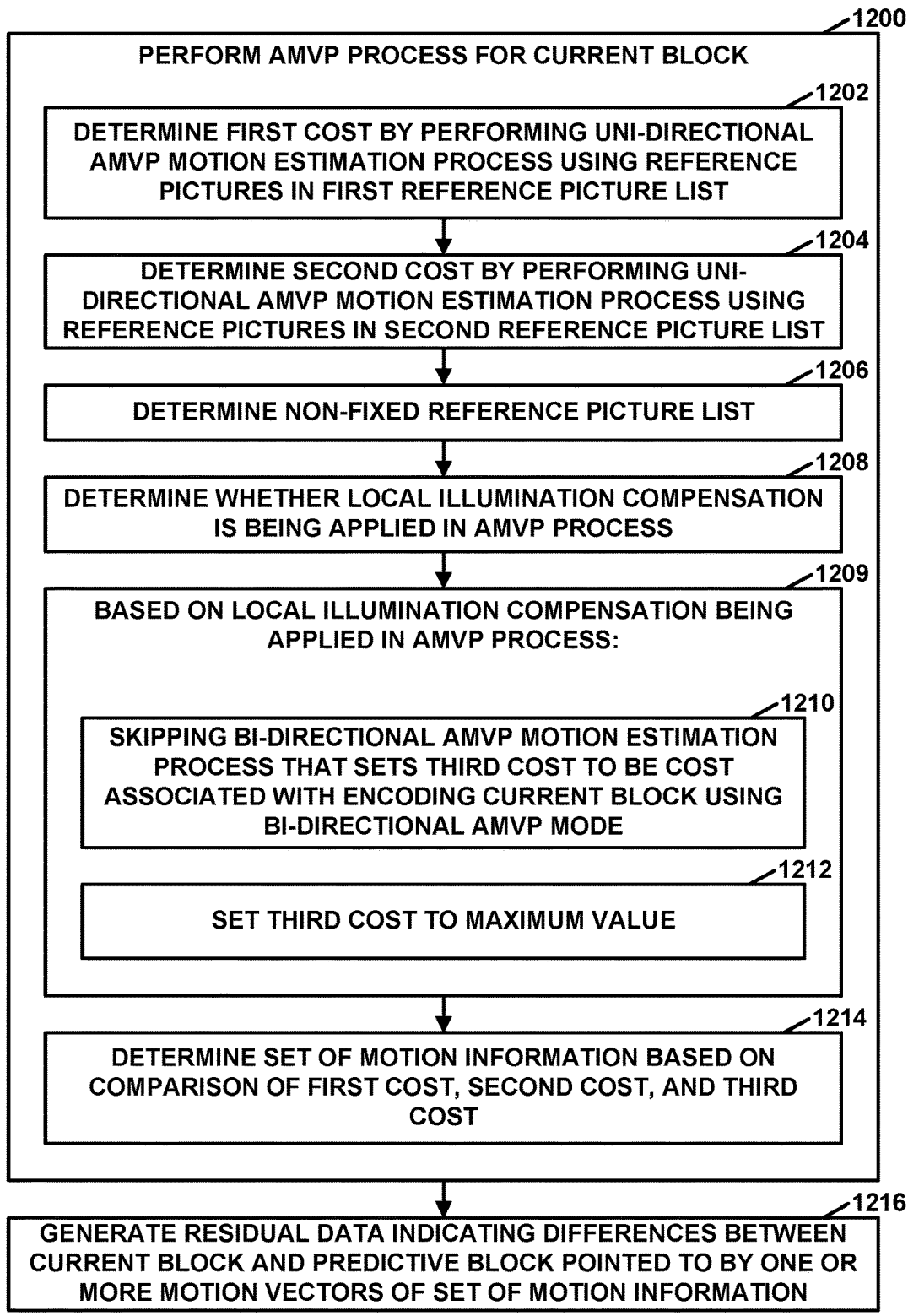
FIG. 12 is a flowchart illustrating an example operation of a video encoder in accordance with a technique of this disclosure.

FIG. 12 is a flowchart illustrating an example operation of video encoder 200 in accordance with a technique of this disclosure. FIG. 12 may be considered in part to be a rephrased version of FIG. 11. In the example of FIG. 12, video encoder 200 may perform an AMVP process for a current block of a current picture of the video data (1200). In the example of FIG. 12, the AMVP process may comprise a series of actions that includes actions (1202) through (1214). The current block may be a CU, PU, or other type of block.

Particularly, in the example of FIG. 12, video encoder 200 may determine a first cost (i.e., COST[0]) by performing a uni-directional AMVP motion estimation process using reference pictures in a first reference picture list (1202). For instance, video encoder 200 may evaluate uni-directional motion hypotheses for the first reference picture list, as described elsewhere in this disclosure. COST[0] may be the cost of the lowest-cost uni-directional motion hypothesis for the first reference picture list.

Additionally, video encoder 200 may determine a second cost (i.e., COST[1]) by performing the uni-directional AMVP motion estimation process using reference pictures in a second reference picture list (1204). For instance, video encoder 200 may evaluate uni-directional motion hypotheses for the second reference picture list, as described elsewhere in this disclosure. COST[1] may be the cost of the lowest-cost uni-directional motion hypothesis for the second reference picture list.

Video encoder 200 may then determine a non-fixed reference picture list (1206). The non-fixed reference picture list is the first reference picture list when the first cost is less than the second cost and the non-fixed reference picture list is the second reference picture list when the second cost is less than the first cost.

Additionally, video encoder 200 may determine whether LIC is being applied in the AMVP process (1208). For instance, assuming that LIC is enabled for a slice that contains the current block, video encoder 200 may perform two passes through the AMVP process. During one of the passes through the AMVP process, video encoder 200 does not apply LIC. In another one of the passes through the AMVP process, video encoder 200 applies LIC. When video encoder 200 applies LIC in the AMVP process, video encoder 200 may use motion estimation to generate predicted signals (e.g., predictive blocks) for the current block and may then generate illumination compensated predicted signals (preduc) for the current block, as described in equation (1). If the current pass through the AMVP process is a pass through the AMVP process in which video encoder 200 applies LIC, video encoder 200 may determine in action 1208 that LIC is being applied in the AMVP.

In some examples, video encoder 200 may signal, in the bitstream, a slice-level flag (e.g., SLICE_LIC_AMVP_ENABLE) that indicates whether LIC can be applied in the AMVP process. Video encoder 200 may determine the value of the slice-level flag in accordance with any of the examples provided elsewhere in this disclosure.

Furthermore, video encoder 200 may perform various processes to determine whether to perform LIC at all with respect to the current block. For example, video encoder 200 may determine whether a temporal distance between the current picture and a closest reference picture to the current picture is less than or equal to a threshold. In this example, video encoder 200 may determine that LIC cannot be applied in the AMVP process when the temporal distance between the current picture and the closest reference picture to the current picture is less than or equal to the threshold.

In another example, video encoder 200 may determine an average histogram difference between a current slice of the current picture and each reference picture in the first reference picture list and the second reference picture list. Additionally, in this example, video encoder 200 may determine whether the average histogram difference is greater than the threshold. In this example, video encoder 200 may determine, based on whether the average histogram difference is greater than the threshold, whether LIC can be applied in the AMVP process.

In another example, video encoder 200 may determine whether a histogram difference between the current picture and each reference picture is greater than or equal to a first threshold. In this example, video encoder 200 may determine, based on the histogram difference being greater than or equal to the first threshold, that local illumination compensation is enabled for the current picture. Additionally, in this example, video encoder 200 may determine, based on LIC being enabled for the current picture, whether the histogram difference is greater than a second threshold different from the first threshold. Video encoder 200 may also determine, based on whether the average histogram difference is greater than the second threshold, that LIC can be applied in the AMVP process.

Based on LIC being applied in the AMVP process (1209), video encoder 200 may skip a bi-directional AMVP motion estimation process that sets a third cost (e.g., COST BI) to be a cost associated with encoding the current block using a bi-directional AMVP mode (1210). Instead, video encoder 200 may set the third cost to a maximum cost value (1212). In other examples, video encoder 200 may set the third cost in other ways, such as described below with respect to FIG. 13.

Furthermore, in the example of FIG. 12, video encoder 200 may determine a set of motion information based on a comparison of the first cost, the second cost, and the third cost (1214). The set of motion information includes one or more motion vectors. For example, to determine the set of motion information, video encoder 200 may determine which of the first cost, the second cost, and the third cost is the smallest. Furthermore, in this example, the determined set of motion information may be the motion information of a motion hypothesis associated with the smallest cost. For instance, if the first cost is the smallest cost, the determined set of motion information may be the motion information of the lowest-cost uni-directional motion hypothesis for the first reference picture list.

Additionally, video encoder 200 may generate residual data indicating differences between the current block and a predictive block pointed to by one or more motion vectors of the set of motion information (1216). For instance, summer 204 (FIG. 2) of video encoder 200 may generate the residual data. Furthermore, in some examples, transform processing unit 206 may apply a transform to the residual data to generate transform coefficients, quantization unit 208 may quantize the transform coefficients, and entropy encoding unit 220 may entropy encode syntax elements representing the quantized transform coefficients.

In some examples, when a CU is encoded using uni-directional AMVP (i.e., uni-AMVP), video encoder 200 signals a LIC flag for the CU. Otherwise, when the CU is not encoded using uni-directional AMVP, video encoder 200 does not signal a LIC flag for the CU. In other words, video encoder 200 may determine whether to signal a LIC flag (i.e., a flag that indicates whether LIC is applied in the current block) in an encoded video bitstream. In this example, video encoder 200 may signal the LIC flag in the encoded video bitstream when the current block is encoded using a uni-directional AMVP mode. Video encoder 200 does not apply LIC to the current block and does not signal the flag in the encoded video bitstream when the current block is encoded using a bi-directional AMVP mode. At the decoder side, video decoder 300 may firstly parse a uni/bi-prediction direction. In other words, video decoder 300 may parse one or more syntax elements from the bitstream that indicate whether the CU is encoded using uni-directional AMVP based on reference picture list 0, using uni-directional AMVP based on reference picture list 1, or using bi-directional AMVP. If the CU is encoded using uni-directional AMVP, then video decoder 300 may parse the LIC flag for the CU. Otherwise, for CUs encoded using bi-directional AMVP (i.e., bi-AMVP), video decoder 300 does not parse a LIC flag for the CU and video decoder 300 may set the LIC flag for the CU to false.

In another example, for a CU with AMVP mode, video encoder 200 may firstly signal a LIC flag before the prediction direction. For instance, if LIC is on, then the CU is coded with uni-AMVP mode. Hence, in this example, it may be unnecessary to encode/decode the uni/bi-prediction direction. Otherwise, in this example, when LIC is off, it may be necessary to encode/decode the uni/bi-prediction direction. Thus, in this example, video encoder 200 may signal a LIC flag (i.e., a flag that indicates whether LIC is applied in the current block) in an encoded video bitstream. Furthermore, in this example, video encoder 200 may determine whether to signal in the encoded video bitstream one or more syntax elements that indicate whether the current block is encoded using a uni-directional AMVP mode or the bi-directional AMVP mode. In this example, video encoder 200 may signal the one or more syntax elements in the encoded video bitstream when the LIC flag indicates that LIC is not applied in the current block. In this example, video encoder 200 may encode the current block using the uni-directional AMVP mode and not signal the one or more syntax elements in the encoded video bitstream when the LIC flag indicates that LIC is applied in the current block.

In some examples, as the coding tree goes deeper, it may be helpful for a CU to refer to its parent and grandparent CUs. By using some coding information from parent and grandparent CUs of the CU, video encoder 200 may be able to skip some unnecessary RD checking for the CU. For instance, in one example, video encoder 200 may first determine whether to apply LIC to a CU that corresponds to a whole CTU (i.e., a root CU) based on whether a lower RD cost was obtained when encoding the root CU with LIC or without using LIC. Video encoder 200 may store an LIC flag for the root CU indicating whether to apply LIC to the root CU. Additionally, in this example, video encoder 200 may partition the root CU into two or more child CUs according to one or more partitioning modes (e.g., a quadtree partitioning mode, one or more triple-tree partitioning modes, one or more binary tree partitioning modes, etc.). For each of the child CUs, video encoder 200 may determine whether to apply LIC to the child CU based on whether a lower RD cost was obtained when encoding the root CU with LIC or without LIC. Video encoder 200 may record an LIC flag for the child CU that indicates whether to apply LIC to the child CU. Video encoder 200 may repeat this process for one or more of the child CUs. In this way, for any given current CU other than the root CU, video encoder 200 may have stored LIC flags for ancestor CUs of the current CU.

To speed up AMVP of a CU, video encoder 200 may use LIC flags of parent and/or grandparent CUs for reference. For example, when checking the AMVP of a current CU, video encoder 200 may use a LIC flag of a parent of the current CU. In other words, video encoder 200 may use a LIC flag of a parent CU of the current CU when performing an AMVP process for the current CU. When the LIC flag of the parent CU of the current CU is true, video encoder 200 may check AMVP with LIC. For instance, when the LIC flag of the parent CU of the current CU is true, video encoder 200 may determine an RD cost for AMVP with LIC in the current CU. Otherwise, video encoder 200 only checks AMVP with LIC off. For instance, when the LIC flag of the parent CU of the current CU is false, video encoder 200 does not perform a pass through the AMVP process in which LIC is applied. In this way, when the LIC flag of the parent CU of the current CU is false, video encoder 200 may avoid the need to determine the RD cost for AMVP with LIC in the current CU. Thus, video encoder 200 may determine, based on LIC flags of at least one of a parent CU or grandparent CU of the current CU, whether LIC can be applied in the AMVP process for the current CU.

In other examples, video encoder 200 may use LIC flags of grandparents and more ancestors. For instance, in one such example, when the successive number of CUs with LIC=1 exceeds a particular threshold, video encoder 200 may only check the LIC=1 case for the current CU. For instance, if the number of ancestor CUs (e.g., parents and grandparents) of the current CU all have LIC flags equal to 1 is greater than a threshold, video encoder 200 does not perform a pass of the AMVP process that does not apply LIC and video encoder 200 may instead only determine the RD cost for AMVP with LIC. Otherwise, if the number of successive ancestor CUs of the current CU that have LIC flags equal to 1 is less than or equal to the threshold, video encoder 200 does not perform a pass through the AMVP process in which LIC is applied and video decoder 300 does not determine the RD cost for AMVP with LIC. In some examples, the threshold differs depending on the depth of the current CU in a CU partitioning tree.

Figure 13:
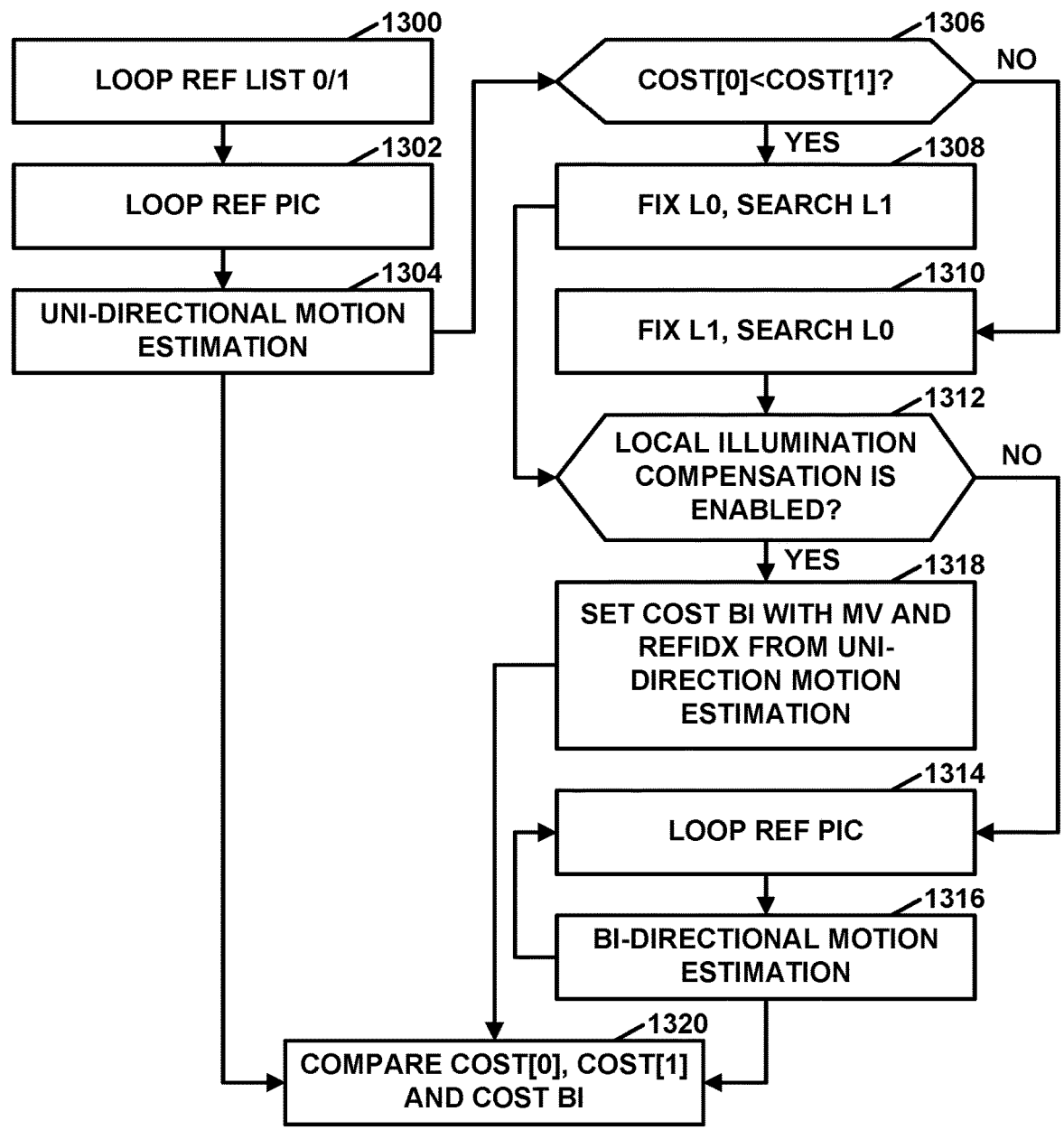
FIG. 13 is a flowchart illustrating am example motion procedure for AMVP mode in which a video encoder may skip bi-directional AMVP motion estimation, in accordance with a technique of this disclosure.

In some examples, instead of disabling LIC for bi-directional AMVP, a CU can skip motion estimation for bi-directional AMVP when LIC is on to reduce complexity. The procedure in FIG. 8 can be simplified as shown in FIG. 13. FIG. 13 is an example motion procedure for AMVP mode in which bi-AMVP motion estimation may be skipped. In other words, FIG. 13 is a flowchart illustrating an example motion procedure for AMVP mode in which a video encoder may skip bi-directional AMVP motion estimation, in accordance with a technique of this disclosure. As shown in FIG. 13 when motion procedure is being performed for a CU with LIC on, motion estimation for bi-AMVP is skipped by calculating the COST BI with motion information of two reference lists derived from uni-AMVP motion estimation.

In the example of FIG. 13, actions (1300), (1302), (1304), (1306), (1308), (1310), (1312), (1314), (1316), (1320) can be performed in the same way as actions (1100), (1102), (1104), (1106), (1108), (1110), (1112), (1114), (1116), and (1120) of FIG. 11. However, in the example of FIG. 13, in response to determining that local illumination compensation is enabled for the current block ("YES" branch of 1312), video encoder 200 may set COST BI with a motion vector (MV) and reference index (Refidx) from uni-directional motion estimation (1318). In other words, video encoder 200 may set COST BI to a cost of a bi-directional motion hypothesis that specifies the lowest-cost uni-directional motion hypothesis for reference picture list 0 determined in action 1304 and the lowest-cost uni-directional motion hypothesis for reference picture list 1 determined in action 1304. Note that this bi-directional motion hypothesis may be different from a lowest-cost bi-directional motion hypothesis identified by performing the third loop of actions 1314 and 1316.

In some examples, video encoder 200 may use coding information of parent and/or grandparent blocks to determine whether to skip the AMVP mode for a current CU. Thus, in some circumstances, video encoder 200 does not perform a process to determine whether the current CU should be encoded using the AMVP mode. For example, video encoder 200 may skip AMVP RD mode checking for the current block when both the parent and grandparent are encoded using the merge mode. The idea behind this is that when both the grandparent and parent are encoded using merge mode (i.e., motion information for the grandparent and parent blocks can be derived from the neighboring blocks), it may be possible to derive motion information of the current CU from the neighbors as well. Thus, in this example, video encoder 200 may determine, based on at least one of a parent CU or a grandparent CU of the current CU being coded using merge mode, whether the AMVP process is enabled for the current CU. Therefore, in such scenarios, a search performed by video encoder 200 can be accelerated by skipping the AMVP mode without significantly comprising the rate-distortion performance.

In QTBT and MTT based coding tree structure, a block may be visited multiple times at the encoder side in different tree branches. The coding information from previous visits can be used to speed up the encoder search. If a block, such as a CU, is coded using an affine mode, translational motion may not be efficient enough to encode it. It is likely that in the future visit, this block is still coded with the affine mode. As such, in the future visit, only affine mode is checked, and other modes are skipped.

That is, when determining how to encode a CTU, video encoder 200 may partition the CTU into CUs according to various partitioning trees. For example, video encoder 200 may partition the CTU into CUs according to multiple different QTBTs or MTTs. In some instances, different partitioning trees include nodes that correspond to blocks having the same sizes and positions within the CTU. Such blocks may be considered to have been visited multiple times when encoding the CTU. Video encoder 200 may retain information about the best encoding mode of a block. Thus, when video encoder 200 revisits the same block in a different partitioning tree of the same CTU, video encoder 200 may use the retained information when determining a best encoding mode of the revisited block. In accordance with a technique of this disclosure, if the retained information indicates that the best encoding mode of the block is an affine mode, video encoder 200 does not check whether the best encoding mode of the block is a merge mode or AMVP mode when video encoder 200 revisits the block. In this way, video encoder 200 may perform a plurality of visits to the current block in different tree branches of a QTBT- or MTT-based coding tree structure and determine, based on the current block being coded with affine mode in a previous visit of the plurality of visits, whether to skip the AMVP process for the current block.

Figure 14:
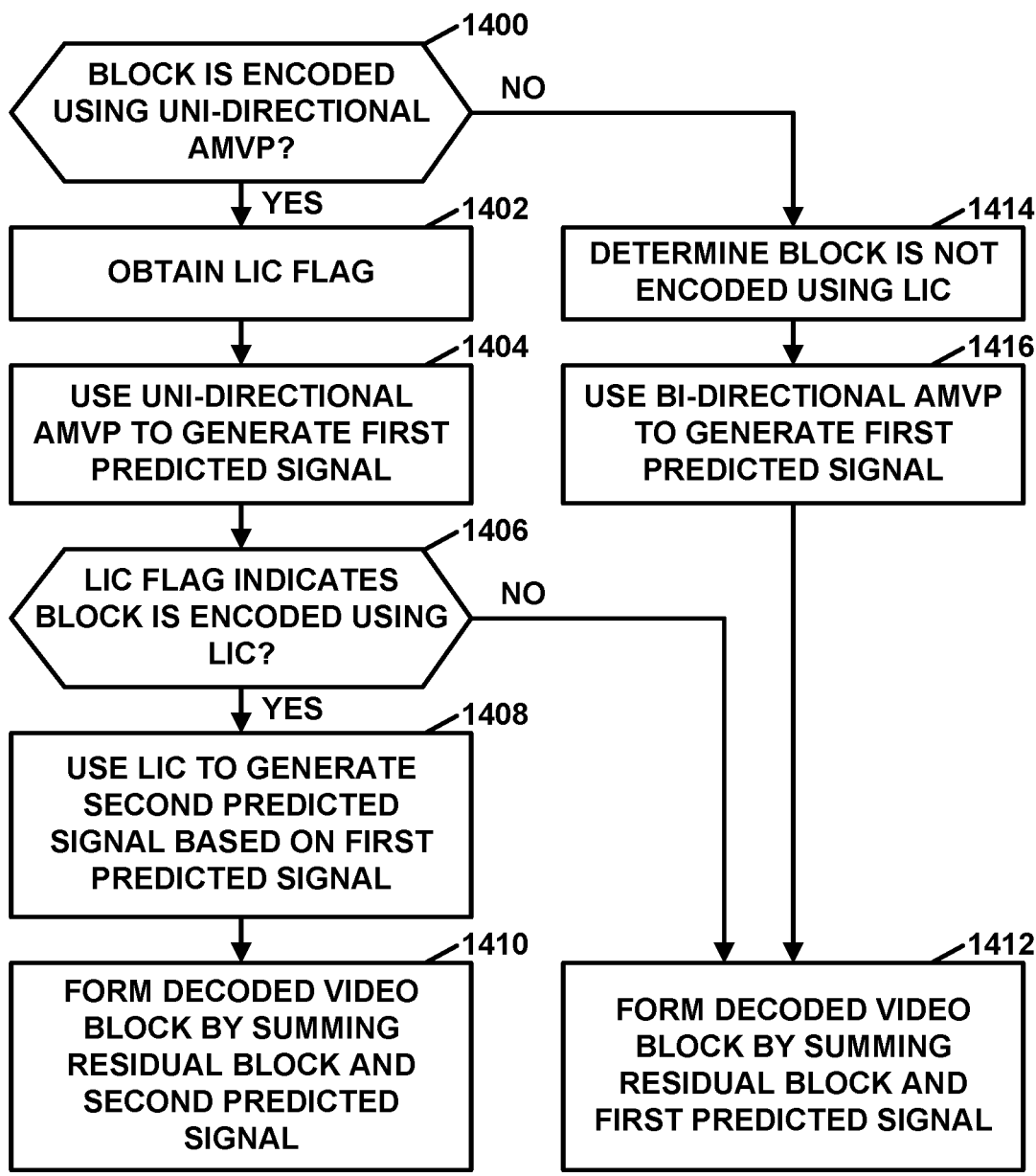
FIG. 14 is a flowchart illustrating an example operation of a video decoder in accordance with a technique of this disclosure.

FIG. 14 is a flowchart illustrating an example operation of video decoder 300 in accordance with a technique of this disclosure. As mentioned above, in some examples, video encoder 200 may signal a LIC flag for a CU when the block is encoded using uni-directional AMVP. Otherwise, when the CU is not encoded using uni-directional AMVP, video encoder 200 does not signal a LIC flag for the CU. FIG. 14 is a flowchart illustrating an example operation of video decoder 300 in accordance with such examples.

In the example of FIG. 14, video decoder 300 may determine whether a block of the video data that is encoded using AMVP is encoded using uni-directional AMVP and not bi-directional AMVP (1400). Based on a determination that the block is encoded using uni-directional AMVP ("YES" branch of 1400), video decoder 300 may obtain a LIC flag from an encoded video bitstream (1402). The LIC flag may indicate whether the block is encoded using LIC. Furthermore, video decoder 300 may use uni-directional AMVP to generate a first predicted signal for the block (1404). Additionally, video decoder 300 may determine whether the LIC flag indicates that the block is encoded using LIC (1406). Based on a determination that the LIC flag indicates that the block is encoded using LIC ("YES" branch of 1406), video decoder 300 may use LIC to generate a second predicted signal for the block based on the first predicted signal (1408) and form a decoded video block by summing a residual block and the second predicted signal (1410). Otherwise, if the LIC flag indicates that the block is not encoded using LIC ("NO" branch of 1406), video decoder 300 may form the decoded video block by summing a residual block and the first predicted signal (1412).

Based on a determination that the block is encoded using bi-directional AMVP ("NO" branch of 1400), video decoder 300 may determine, without obtaining the LIC flag from the encoded video bitstream, that the block is not encoded using LIC (1414). In addition, video decoder 300 may use bi-directional AMVP to generate the first predicted signal for the block (1416) and form a decoded video block by summing a residual block and the first predicted signal (1412).

Figure 15:
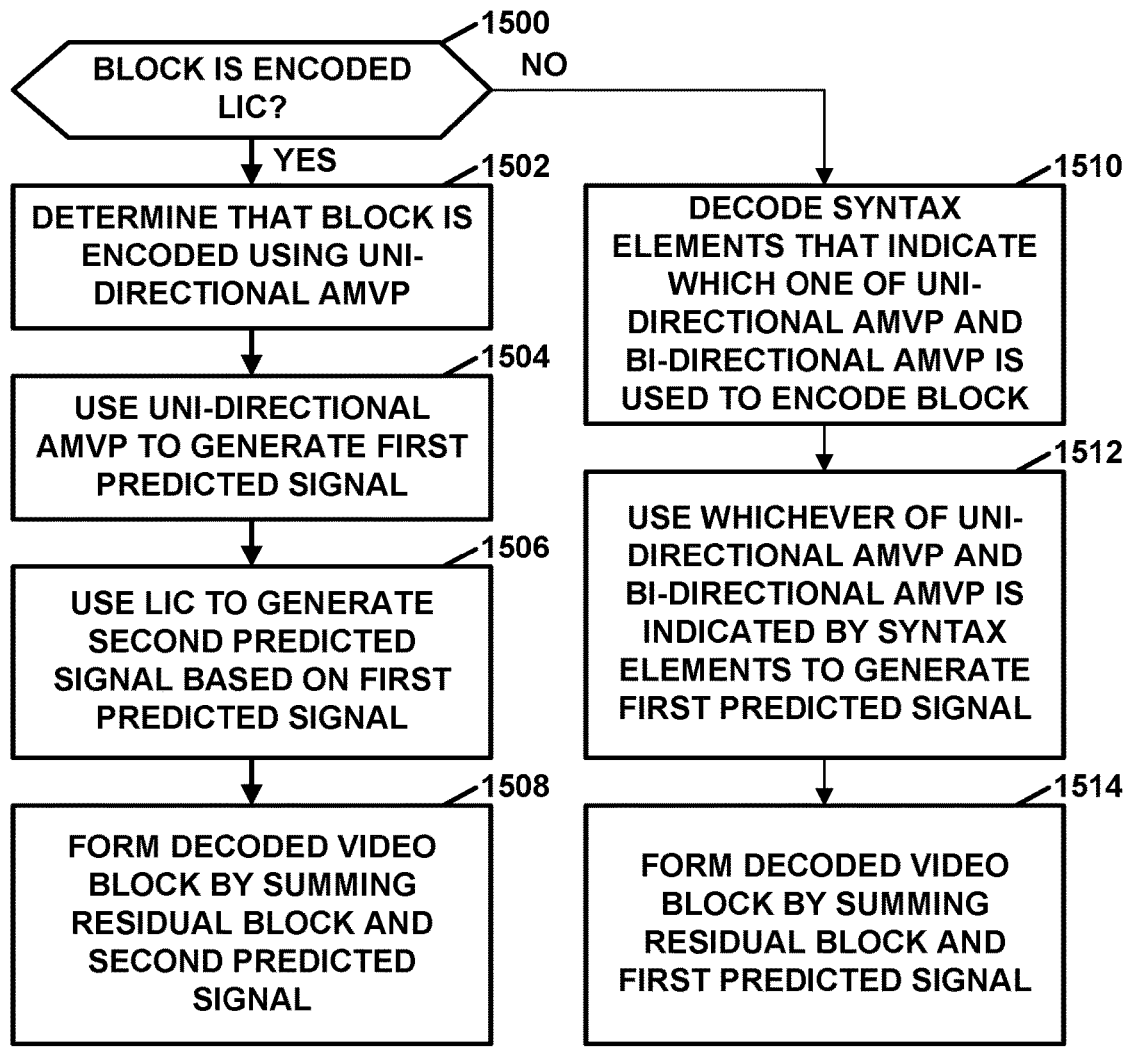
FIG. 15 is a flowchart illustrating an example operation of a video decoder in accordance with a technique of this disclosure.

FIG. 15 is a flowchart illustrating an example operation of video decoder 300 in accordance with a technique of this disclosure. As mentioned above, in some examples, for a CU with AMVP mode, video encoder 200 may firstly signal a LIC flag before the prediction direction. For instance, if LIC is on, then the CU is coded with uni-AMVP mode. Hence, in this example, it may be unnecessary to encode/decode the uni/bi-prediction direction. Otherwise, in this example, when LIC is off, it may be necessary to encode/decode the uni/bi-prediction direction. FIG. 15 is a flowchart illustrating an example operation of video decoder 300 in accordance with such examples.

In the example of FIG. 15, video decoder 300 may determine, based on a LIC flag signaled in an encoded video bitstream, whether a block of video data that is encoded using AMVP is encoded using LIC (1500). Based on a determination that the block is encoded using LIC ("YES" branch of 1500), video decoder 300 may automatically determine the block is encoded using uni-directional AMVP and not bi-directional AMVP without decoding any syntax elements that explicitly indicate that the block is encoded using uni-directional AMVP and not bi-directional AMVP (1502). Accordingly, video decoder 300 may use uni-directional AMVP to generate a first predicted signal for the block (1504). Additionally, video decoder 300 may use LIC to generate a second predicted signal for the block based on the first predicted signal (1506). For instance, video decoder 300 may use LIC to generate the second predicted signal as described with respect to equation (1), above. Video decoder 300 may form a decoded video block by summing a residual block and the second predicted signal (1508).

On the other hand, based on a determination that the block is not encoded using LIC ("NO" branch of 1500), video decoder 300 may decode one or more syntax elements that explicitly indicate which one of uni-directional AMVP and bi-directional AMVP is used to encode the block (1510). Furthermore, video decoder 300 may use whichever of uni-directional AMVP and bi-directional AMVP is indicated by the one or more syntax element to generate the first predicted signal for the block (1512). Video decoder 300 may form a decoded video block by summing a residual block and the first predicted signal (1514).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as computer-readable data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Computer-readable data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
performing, by a video encoder, an Advanced Motion Vector Prediction (AMVP) process for a current block of a current picture of the video data, wherein performing the AMVP process comprises:
determining, by the video encoder, a first cost by performing a uni-directional AMVP motion estimation process using reference pictures in a first reference picture list;
determining, by the video encoder, a second cost by performing the uni-directional AMVP motion estimation process using reference pictures in a second reference picture list;
determining, by the video encoder, a non-fixed reference picture list, wherein the non-fixed reference picture list is the first reference picture list when the first cost is less than the second cost and the non-fixed reference picture list is the second reference picture list when the second cost is less than the first cost;
determining, by the video encoder, whether local illumination compensation (LIC) is being applied in the AMVP process;
based on LIC being applied in the AMVP process:
skipping, by the video encoder, a bi-directional AMVP motion estimation process that sets a third cost to be a cost associated with encoding the current block using a bi-directional AMVP mode; and
setting, by the video encoder, the third cost to a maximum cost value; and
determining, by the video encoder, a set of motion information based on a comparison of the first cost, the second cost, and the third cost, wherein the set of motion information includes one or more motion vectors; and generating, by the video encoder, residual data indicating differences between the current block and a predictive block pointed to by the one or more motion vectors of the set of motion information.

2. The method of claim 1, further comprising signaling, in an encoded video bitstream, a slice-level flag that indicates whether LIC can be applied in the AMVP process.

3. The method of claim 1, further comprising determining, by the video encoder, whether to signal a flag in an encoded video bitstream, the flag indicating whether LIC is applied in the current block, wherein:
the video encoder signals the flag in the encoded video bitstream when the current block is encoded using a uni-directional AMVP mode, and
LIC is not applied to the block and the video encoder does not signal the flag in the encoded video bitstream when the current block is encoded using a bi-directional AMVP mode.

4. The method of claim 1, wherein the current block is encoded using AMVP and the method further comprises:
signaling, by the video encoder, a flag in an encoded video bitstream, the flag indicating whether LIC is applied in the current block; and
determining, by the video encoder, whether to signal in the encoded video bitstream one or more syntax elements that indicate whether the current block is encoded using a uni-directional AMVP mode or the bi-directional AMVP mode,
wherein the video encoder signals the one or more syntax elements in the encoded video bitstream when the flag indicates that LIC is not applied in the current block, and
wherein the video encoder encodes the current block using the uni-directional AMVP mode and does not signal the one or more syntax elements in the encoded video bitstream when the flag indicates that LIC is applied in the current block.

5. The method of claim 1, further comprising:
determining, by the video encoder, whether a temporal distance between the current picture and a closest reference picture to the current picture is less than or equal to a threshold; and
determining, by the video encoder, that LIC cannot be applied in the AMVP process when the temporal distance between the current picture and the closest reference picture to the current picture is less than or equal to the threshold.

6. The method of claim 1, further comprising:
determining, by the video encoder, an average histogram difference between a current slice of the current picture and each reference picture in the first reference picture list and the second reference picture list;
determining, by the video encoder, whether the average histogram difference is greater than a threshold; and
determining, by the video encoder, based on whether the average histogram difference is greater than the threshold, whether local illumination compensation can be applied in the AMVP process.

7. The method of claim 1, further comprising:
determining, by the video encoder, whether a histogram difference between the current picture and each reference picture is greater than or equal to a first threshold;
determining, by the video encoder, based on the histogram difference being greater than or equal to the first threshold, that local illumination compensation is enabled for the current picture;
determining, by the video encoder, based on local illumination compensation being enabled for the current picture, whether the histogram difference is greater than a second threshold different from the first threshold; and
determining, by the video encoder, based on whether the average histogram difference is greater than the second threshold, that local illumination compensation can be applied in the AMVP process.

8. The method of claim 1, wherein the current block is a current coding unit (CU) and the method further comprises:
determining, by the video encoder, based on a local illumination compensation (LIC) flag of at least one of a parent CU or grandparent CU of the current CU whether LIC can be applied in the AMVP process.

9. The method of claim 1, wherein the current block is a current CU and the method further comprises:
determining, by the video encoder, based on at least one of a parent CU or a grandparent CU of the current CU being coded using merge mode, whether the AMVP process is enabled for the current CU.

10. The method of claim 1, wherein the current block is a first block of the current picture, and the current picture includes a second block, the method further comprising:
performing, by the video encoder, a plurality of visits to the second block in different tree branches of a Quad-Tree Binary Tree (QTBT)- or Multi-Type-Tree (MTT)-based coding tree structure; and
determining, based on the second block being coded with affine mode in a previous visit of the plurality of visits, whether to skip the AMVP process for the second block.

11. A video encoding device comprising:
a memory configured to store video data; and
one or more processing circuits configured to:
perform an Advanced Motion Vector Prediction (AMVP) process for a current block of a current picture of the video data, wherein the one or more processing circuits are configured such that, as part of performing the AMVP process, the one or more processing circuits:
determine a first cost by performing a uni-directional AMVP motion estimation process using reference pictures in a first reference picture list;
determine a second cost by performing the uni-directional AMVP motion estimation process using reference pictures in a second reference picture list;
determine a non-fixed reference picture list, wherein the non-fixed reference picture list is the first reference picture list when the first cost is less than the second cost and the non-fixed reference picture list is the second reference picture list when the second cost is less than the first cost;
determine whether local illumination compensation (LIC) is being applied in the AMVP process;
based on LIC being applied in the AMVP process:
skip a bi-directional AMVP motion estimation process that sets a third cost to be a cost associated with encoding the current block using a bi-directional AMVP mode; and
set the third cost to a maximum cost value; and
determine a set of motion information based on a comparison of the first cost, the second cost, and the third cost, wherein the set of motion information includes one or more motion vectors; and
generate residual data indicating differences between the current block and a predictive block pointed to by the one or more motion vectors of the set of motion information.

12. The video encoding device of claim 11, wherein the one or more processing circuits are configured to signal, in an encoded video bitstream, a slice-level flag that indicates whether LIC can be applied in the AMVP process.

13. The video encoding device of claim 11, wherein the one or more processing circuits are configured to determine whether to signal a flag in an encoded video bitstream, the flag indicating whether LIC is applied in the current block, wherein:
the one or more processing circuits signal the flag in the encoded video bitstream when the current block is encoded using a uni-directional AMVP mode, and
LIC is not applied to the block and the one or more processing circuits do not signal the flag in the encoded video bitstream when the current block is encoded using a bi-directional AMVP mode.

14. The video encoding device of claim 11, wherein the current block is encoded using AMVP and the one or more processing circuits are further configured to:
signal a flag in an encoded video bitstream, the flag indicating whether LIC is applied in the current block;
determine whether to signal in the encoded video bitstream one or more syntax elements that indicate whether the current block is encoded using a uni-directional AMVP mode or the bi-directional AMVP mode;
signal the one or more syntax elements in the encoded video bitstream when the flag indicates that LIC is not applied in the current block; and
encode the current block using the uni-directional AMVP mode and not signal the one or more syntax elements in the encoded video bitstream when the flag indicates that LIC is applied in the current block.

15. The video encoding device of claim 11, wherein the one or more processing circuits are further configured to:
determine whether a temporal distance between the current picture and a closest reference picture to the current picture is less than or equal to a threshold; and
determine that LIC cannot be applied in the AMVP process when the temporal distance between the current picture and the closest reference picture to the current picture is less than or equal to the threshold.

16. The video encoding device of claim 11, wherein the one or more processing circuits are further configured to:
determine an average histogram difference between a current slice of the current picture and each reference picture in the first reference picture list and the second reference picture list;
determine whether the average histogram difference is greater than a threshold; and
determine, based on whether the average histogram difference is greater than the threshold, whether local illumination compensation can be applied in the AMVP process.

17. The video encoding device of claim 11, wherein the one or more processing circuits are further configured to:
determine whether a histogram difference between the current picture and each reference picture is greater than or equal to a first threshold;
determine, based on the histogram difference being greater than or equal to the first threshold, that local illumination compensation is enabled for the current picture;
determine, based on local illumination compensation being enabled for the current picture, whether the histogram difference is greater than a second threshold different from the first threshold; and
determine, based on whether the average histogram difference is greater than the second threshold, that local illumination compensation can be applied in the AMVP process.

18. The video encoding device of claim 11, wherein the current block is a current coding unit (CU) and the one or more processing circuits are further configured to:
determine, based on a local illumination compensation (LIC) flag of at least one of a parent CU or grandparent CU of the current CU whether LIC can be applied in the AMVP process.

19. The video encoding device of claim 11, wherein the current block is a current CU and the one or more processing circuits are further configured to:
determine, based on at least one of a parent CU or a grandparent CU of the current CU being coded using merge mode, whether the AMVP process is enabled for the current CU.

20. The video encoding device of claim 11, wherein the current block is a first block of the current picture, the current picture includes a second block, and the one or more processing circuits are further configured to:
perform a plurality of visits to the second current block in different tree branches of a Quad-Tree Binary Tree (QTBT)- or Multi-Type-Tree (MTT)-based coding tree structure; and
determine, on the second block being coded with affine mode in a previous visit of the plurality of visits, whether to skip the AMVP process for the second block.

21. A device for decoding video data, the device comprising:
a memory configured to store video data; and
one or more processing circuits configured to:
determine whether a block of the video data that is encoded using Advanced Motion Vector Prediction (AMVP) is encoded using uni-directional AMVP and not bi-directional AMVP;
based on the block being encoded using uni-directional AMVP:
obtain a local illumination compensation (LIC) flag from an encoded video bitstream, the LIC flag indicating whether the block is encoded using LIC;
use uni-directional AMVP to generate a first predicted signal for the block;
based on the LIC flag indicating that the block is encoded using LIC, use LIC to generate a second predicted signal for the block based on the first predicted signal; and
form a decoded video block by summing a residual block and the second predicted signal.

22. The device of claim 21, wherein the block is a first block, the method further comprising:
determine whether a second block of the video data that is encoded using AMVP is encoded using uni-directional AMVP and not bi-directional AMVP;
based on the second block being encoded using bi-directional AMVP:

determine that the second block is not encoded using LIC without obtaining a LIC flag that indicates whether the second block is encoded using LIC;

use bi-directional AMVP to generate a third predicted signal for the second block; and form a second decoded video block by summing a second residual block and the third predicted signal.

23. A device for decoding video data, the device comprising:

a memory configured to store video data; and one or more processing circuits configured to:

determine, based on a local illumination compensation (LIC) flag signaled in an encoded video bitstream, that a block of the video data that is encoded using Advanced Motion Vector Prediction (AMVP) is encoded using LIC; and based on the block being encoded using LIC:

determine that the block is encoded using uni-directional AMVP and not bi-directional AMVP without decoding any syntax elements that explicitly indicate that the block is encoded using uni-directional AMVP and not bi-directional AMVP;

use uni-directional AMVP to generate a first predicted signal for the block; use LIC to generate a second predicted signal for the block based on the first predicted signal; and form a decoded video block by summing a residual block and the second predicted signal.

* * * * *